(12) United States Patent
Ishikawa et al.

(10) Patent No.: US 8,172,711 B2
(45) Date of Patent: May 8, 2012

(54) HYDRAULIC CONTROL APPARATUS OF AUTOMATIC TRANSMISSION

(75) Inventors: Kazunori Ishikawa, Toyota (JP); Kazuyuki Noda, Handa (JP); Akihito Iwata, Hetrinan (JP); Yuhei Yoshioka, Anjo (JP); Tatsuya Kawamura, Nagoya (JP); Koichi Miyamoto, Nagoya (JP); Hideo Tomomatsu, Nagoya (JP)

(73) Assignees: Aisin AW Co., Ltd., Aichi-ken (JP); Toyota Jidosha Kabushiki Kaisha, Aichi-ken (JP)

( * ) Notice: Subject to any disclaimer, the term of this patent is extended or adjusted under 35 U.S.C. 154(b) by 296 days.

(21) Appl. No.: 12/717,494

(22) Filed: Mar. 4, 2010

(65) Prior Publication Data

US 2010/0229969 A1 Sep. 16, 2010

(30) Foreign Application Priority Data

Mar. 10, 2009 (JP) ................... 2009-056695

(51) Int. Cl.
*F16H 61/12* (2010.01)
(52) U.S. Cl. ...................................... 475/119
(58) Field of Classification Search .............. 475/119; 477/125
See application file for complete search history.

(56) References Cited

U.S. PATENT DOCUMENTS

| | | | |
|---|---|---|---|
| 4,756,213 A * | 7/1988 | Mainquist et al. | 477/62 |
| 4,903,551 A | 2/1990 | Hiramatsu et al. | |
| 5,010,786 A | 4/1991 | Hiramatsu et al. | |
| 5,538,479 A | 7/1996 | Niiyama | |
| 6,299,560 B1 | 10/2001 | Fujioka et al. | |
| 7,128,676 B2 * | 10/2006 | Kinugasa et al. | 475/5 |
| 2007/0161448 A1 | 7/2007 | Sato et al. | |
| 2007/0161449 A1 | 7/2007 | Hayashi et al. | |
| 2007/0167283 A1 | 7/2007 | Sato et al. | |

FOREIGN PATENT DOCUMENTS

| | | |
|---|---|---|
| JP | 63-210443 A | 9/1988 |
| JP | 8-042681 A | 2/1996 |
| JP | 2000-249219 A | 9/2000 |
| JP | 2001-330137 A | 11/2001 |
| WO | 2007/077663 A1 | 7/2007 |
| WO | 2007/077664 A1 | 7/2007 |

* cited by examiner

*Primary Examiner* — Sherry Estremsky
(74) *Attorney, Agent, or Firm* — Sughrue Mion, PLLC

(57) ABSTRACT

A hydraulic control apparatus of an automatic transmission having engagement pressure solenoid valves configured to regulate an engagement pressure supplied to a hydraulic servo of a frictional engagement element and to output the engagement pressures from a predetermined number of the engagement pressure solenoid valves to establish respective transmission gear speeds. The hydraulic control apparatus includes a simultaneous engagement signal switch valve configured to be switched from a non-output position where an output of a simultaneous engagement signal pressure is not produced to an output position where an output of the simultaneous engagement signal pressure is produced upon receipt of an input of the engagement pressures by a number larger than the predetermined number of valves; and an original pressure switch valve configured to be switched from a supply position where an original pressure is supplied to the engagement pressure solenoid valves to a blocked position where the original pressure is blocked upon receipt of an input of the simultaneous engagement signal pressure from the simultaneous engagement signal switch valve.

9 Claims, 7 Drawing Sheets

FIG.2

|  | C-1 | C-2 | C-3 | C-4 | B-1 | B-2 | F-1 |
|---|---|---|---|---|---|---|---|
| P |  |  |  |  |  |  |  |
| REV |  |  |  | O |  | O |  |
| N |  |  |  |  |  |  |  |
| 1ST | O |  |  |  |  | (O) | O |
| 2ND | O |  |  |  | O |  |  |
| 3RD | O |  | O |  |  |  |  |
| 4TH | O |  |  | O |  |  |  |
| 5TH | O | O |  |  |  |  |  |
| 6TH |  | O |  | O |  |  |  |
| 7TH |  | O | O |  |  |  |  |
| 8TH |  | O |  |  | O |  |  |

(O) WHEN ENGINE BRAKE IS APPLIED

FIG.4

<TABLE OF SOL OPERATION>

| RANGE | ON/OFF SOLENOID | | | | LINEAR SOLENOID | | | | |
|---|---|---|---|---|---|---|---|---|---|
| | S1 N/C | S2 N/C | S3 N/C | S4 N/O | SL1 N/C | SL2 N/C | SL3 N/C | SL4 N/C | SL5 N/C |
| P | × | ○ | × | | × | × | × | × | × |
| R | ○ | × | × | ○ | × | ○ | × | ○ | × |
| N | ○ | × | × | ○ | × | × | × | × | × |
| D 1st | × | × | × | ○ | ○ | × | × | × | × |
| D 1st E/B | ○ | × | × | ○ | ○ | ○ | × | × | × |
| D 2nd | × | × | × | ○ | ○ | × | × | × | × |
| D 3rd | × | × | × | ○ | ○ | × | ○ | × | × |
| D 4th | × | × | × | ○ | ○ | × | × | ○ | ○ |
| D 5th | × | × | × | ○ | ○ | ○ | × | × | × |
| D 6th | × | × | × | ○ | × | ○ | × | ○ | × |
| D 7th | × | × | × | ○ | × | ○ | ○ | × | × |
| D 8th | × | × | × | ○ | × | ○ | × | × | ○ |

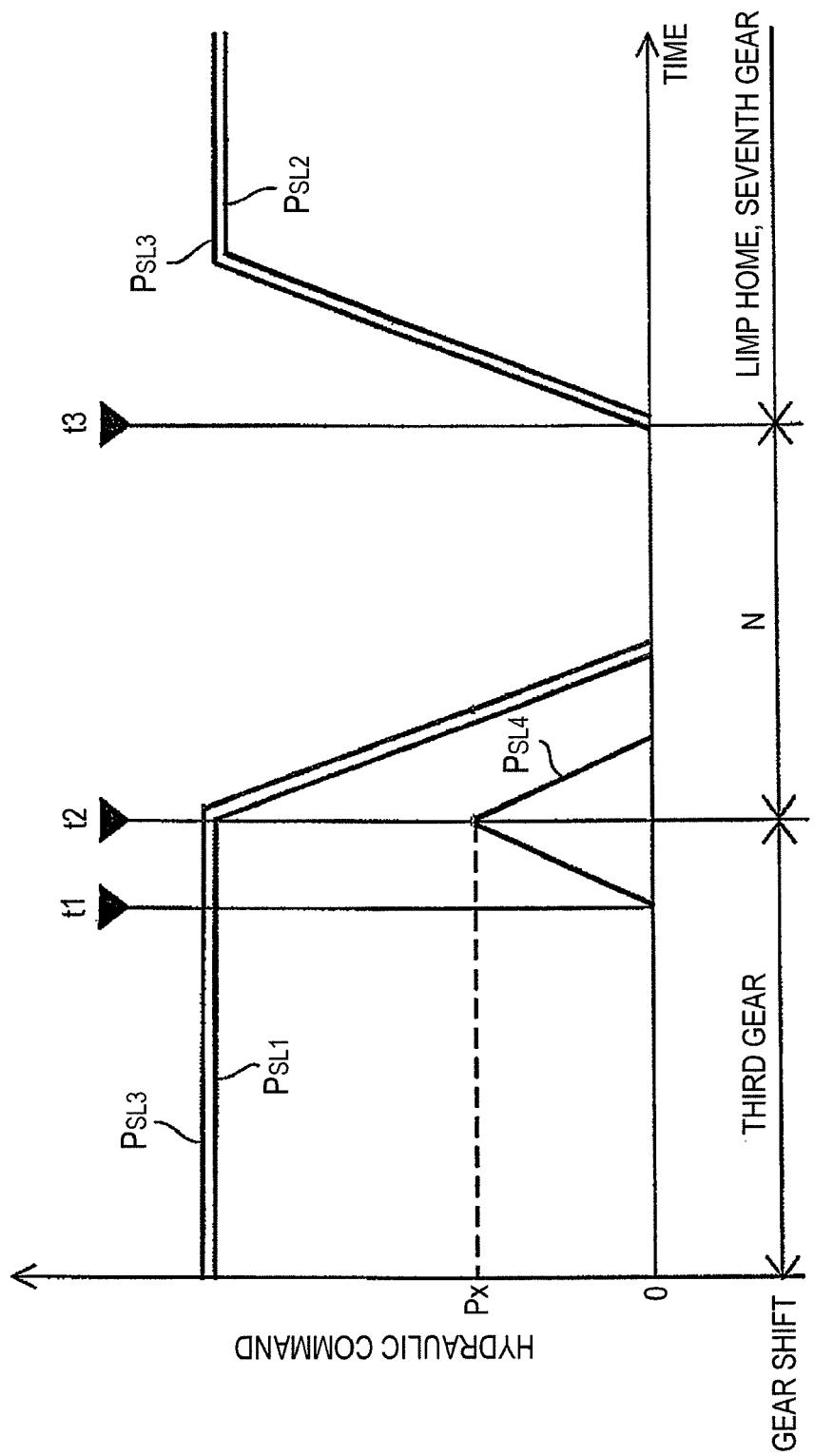

HYDRAULIC CONTROL APPARATUS OF AUTOMATIC TRANSMISSION

CROSS-REFERENCE

Japanese Patent Application No. 2009-056695 filed on Mar. 10, 2009 including the specification, drawings and abstract is incorporated herein by reference in its entirety.

BACKGROUND OF THE INVENTION

1. Field of the Invention

The present invention relates to a hydraulic control apparatus of an automatic transmission to be mounted, for example, on a vehicle and, more specifically, to a hydraulic control apparatus of an automatic transmission for establishing transmission gear speeds by engaging a predetermined number of frictional engagement elements and preventing simultaneous engagement of a predetermined number or more of frictional engagement elements.

2. Description of the Related Art

In general, in a field of a multispeed automatic transmission to be mounted on a vehicle or the like, those configured to establish transmission gear speeds by engagement between, for example, two clutches and brakes (frictional engagement elements), and change the speed by changing a grip of the clutches and brakes go mainstream. In addition, in recent years, in the field of the multispeed automatic transmission, those improved in performance of a linear solenoid valve, and employing a configuration in which a hydraulic pressure regulated by the linear solenoid valve is supplied directly to hydraulic servos of the clutches and the brakes as an engagement pressure go mainstream.

In the multispeed automatic transmission as described above, for example, when three or more clutches and brakes are engaged simultaneously, a contradiction arises in a rotating state of a change gear mechanism, which may disadvantageously result in so-called a stall state. However, as described above, since the engagement pressure is controlled by the plurality of linear solenoid valves individually, if something unusual (for example, disconnection, short circuit, valve stick) occurs in the linear solenoid valves, unintended clutch or brake may engage, that is, a state in which three or more clutches and brakes are going to engage simultaneously may result.

Accordingly, fail-safe valves (600, 700) configured to allow inputs of engagement pressures from three linear solenoid valves and allow passage of the engagement pressure of one of the linear solenoid valves therethrough are provided and, when three of more engagement pressures are applied simultaneously, one of the engagement pressures passing therethrough is blocked to prevent the three or more clutches and brakes from engaging simultaneously is proposed (see JP-A-63-210443 (Patent Document 1)).

However, since the above-described fail-safe valves are configured to block the one of the three engagement pressures when the three engagement pressures are input, a number of the fail-safe valves are required for preventing the simultaneous engagement in the respective transmission gear speeds in automatic transmissions having multiplied speeds like, for example, those with forward eight speeds. In addition, formation of a number of oil channels is required for allowing inputs of the three engagement pressures to a number of the fail-safe valves. Consequently, there arises a problem of deterioration in terms of vehicle-mountability as a result of upsizing of the hydraulic control apparatus.

Furthermore, when causing the engagement pressure to pass through the fail-safe valve for allowing the engagement pressure to be blocked, the fail-safe valve is mandatory interposed in a range from the linear solenoid valve to hydraulic servos of the clutches and brakes, and hence resistance in a duct line during a supply of the engagement pressure under the normal state is increased, that is, the hydraulic responsiveness is lowered, and hence controllability of the clutches and the brakes is deteriorated, so that there arises a problem such that deterioration of transmission response or increase in generation of engagement shock may occur.

SUMMARY OF THE INVENTION

Accordingly, it is an object of the present invention to provide a hydraulic control apparatus of an automatic transmission which avoids necessity of arrangement of a number of valves while allowing prevention of occurrence of simultaneous engagement and enables prevention of deterioration in hydraulic responsiveness.

The present invention is directed to a hydraulic control apparatus of a automatic transmission having a plurality of engagement pressure solenoid valves configured to regulate engagement pressures supplied to hydraulic servos of a frictional engagement elements and being configured to output the engagement pressures from a predetermined number (for example, two) of the engagement pressure solenoid valves from among the plurality of engagement pressure solenoid valves to establish respective transmission gear speeds by engagement of a predetermined number of the frictional engagement elements, which includes a simultaneous engagement signal switch valve configured to be switched from a non-output position (left half position) where an output of a simultaneous engagement signal pressure is not produced to an output position (right half position) where an output of the simultaneous engagement signal pressure is produced upon receipt of an input of the engagement pressures by a number (three or more) larger than the predetermined number (two); and an original pressure switch valve configured to be switched from a supply position (left half position) where an original pressure is supplied to the plurality of engagement pressure solenoid valves to a blocked position (right half position) where the original pressure is blocked upon receipt of an input of the simultaneous engagement signal pressure ($P_{FSV}$) from the simultaneous engagement signal switch valve.

Also, in an aspect of the present invention, the automatic transmission establishes the respective transmission gear speeds by an engagement of a predetermined two of the frictional engagement elements, and the simultaneous engagement signal switch valve includes spools, a plurality of oil chambers configured to receive inputs of the respective engagement pressures to cause the same to act on the spools, an opposed oil chamber to do a counter action against two of the engagement pressures which act on the spools by receiving an input of the original pressure, and an urging member providing an urging force which is defeated by a third engagement pressure acting on the spools, and is switched to the output position (right half position) where an output of the simultaneous engagement signal pressure is produced when the plurality of oil chambers receive inputs of the three or more engagement pressures.

In detail, in an aspect of the present invention, the simultaneous engagement signal switch valve includes an input port configured to receive an input of the original pressure, an output port configured to communicate with the input port when being switched to the output position (right half position) and produce an output of the original pressure as the simultaneous engagement signal pressure, and a lock oil chamber configured to receive an input of the simultaneous engagement signal pressure output from the output port to lock the spool to the output position (right half position).

Also, specifically, an aspect of the present invention further includes a fail solenoid valve being capable of producing an output of the fail signal pressure; and a fail-safe switch valve configured to block the original pressure of the simultaneous engagement signal pressure of the simultaneous engagement signal switch valve and produce outputs of the original pressure from the original pressure switch valve to exhaust ports of two of the plurality of engagement pressure solenoid valves as reverse input pressures for reversely inputting the same upon receipt of an input of the fail signal pressure from the fail solenoid valve.

In detail, an aspect of the present invention further includes an original pressure switch solenoid valve being capable of producing an output of an original signal pressure for switching the original pressure switch valve; and a shuttle valve configured to produce an output of a larger one of the original signal pressure and the simultaneous engagement signal pressure to the original pressure switch valve.

According to a first aspect of the present invention, an output of the simultaneous engagement signal pressure is produced when the simultaneous engagement signal switch valve receives inputs of the engagement pressures by a number larger than the predetermined number, and the original pressure to the engagement pressure solenoid valves is blocked when the original pressure switch valve receives an input of the simultaneous engagement signal pressure from the simultaneous engagement signal switch valve. Therefore, the simultaneous engagement of the predetermined number or more of frictional engagement elements is prevented without the necessity of a number of fail-safe valves or a number of oil channels, and downsizing of the hydraulic control apparatus is achieved, so that vehicle mountability is improved. Also, since the necessity of the passage of the engagement pressures through the fail-safe valves when supplying the same to the hydraulic servos can be eliminated, the hydraulic responsiveness to the frictional engagement elements is improved, and hence improvement of transmission response and reduction of an engagement shock are also achieved. Since what is essential for the fail-safe valve is only to input the respective engagement pressures as a signal without causing the same to pass therethrough, the diameter of the valve by itself may be reduced, for example, in comparison with the valve interposed in oil channels for supplying the engagement pressures to the hydraulic servo and configured to allow the engagement pressures to pass therethrough.

According to a second aspect of the present invention, since the simultaneous engagement signal switch valve includes the spool, the plurality of oil chambers configured to receive inputs of the respective engagement pressures to cause the same to act on the spool, the opposed oil chamber to do the counter action against the two engagement pressures which act on the spool by receiving an input of the original pressure, and the urging member providing the urging force which is defeated by the third engagement pressure acting on the spools, a configuration in which switching to the output position where an output of the simultaneous engagement signal pressure is produced when the plurality of oil chambers receives inputs of the three or more engagement pressures is achieved.

According to a third aspect of the present invention, since the simultaneous engagement signal switch valve is configured to lock the spool at the output position even when the original pressure switch valve blocks the original pressure to the engagement pressure solenoid valves by the output of the simultaneous engagement signal pressure, occurrence of hunching such that inputs of the predetermined number or more of the engagement pressures from the engagement pressure solenoid valves are no longer supplied and hence the spool returns back to the non-output position can be prevented.

According to a fourth aspect of the present invention, since the fail-safe switch valve configured to block the original pressure of the simultaneous engagement signal pressure of the simultaneous engagement signal switch valve and produce outputs of the original pressure from the original pressure switch valve to the exhaust ports of two of the plurality of engagement pressure solenoid valves as the reverse input pressures for reversely inputting the same upon receipt of an input of the fail signal pressure from the fail solenoid valve, a shift from a state in which the original pressure to the engagement pressure solenoid valves is blocked (that is, the neutral state) to the traveling state in which the transmission gear speed is established by engaging the two frictional engagement elements (that is, the limp home) can be achieved by controlling the fail solenoid valve.

According to a fifth aspect of the present invention, since the original pressure switch solenoid valve being capable of producing an output of the original signal pressure for switching the original pressure switch valve, and the shuttle valve configured to produce an output of the larger one of the original signal pressure and the simultaneous engagement signal pressure to the original pressure switch valve are provided, while switching of the original pressure switch valve can be performed by the control of the original pressure switch solenoid valve in the normal state, the original pressure switch valve can be switched by the simultaneous engagement signal pressure when the simultaneous engagement signal switch valve produces an output of the simultaneous engagement signal pressure.

BRIEF DESCRIPTION OF THE DRAWINGS

FIG. 2 is a table of operation of the automatic transmission;

FIG. 4 is a table of operation of the hydraulic control apparatus;

FIG. 7 is a time chart showing fail-safe control according to the present invention.

DETAILED DESCRIPTION OF THE EMBODIMENTS

Referring now to FIG. 1 to FIG. 7, an embodiment of the present invention will be described.

[Configuration of Automatic Transmission]

Figure 1:
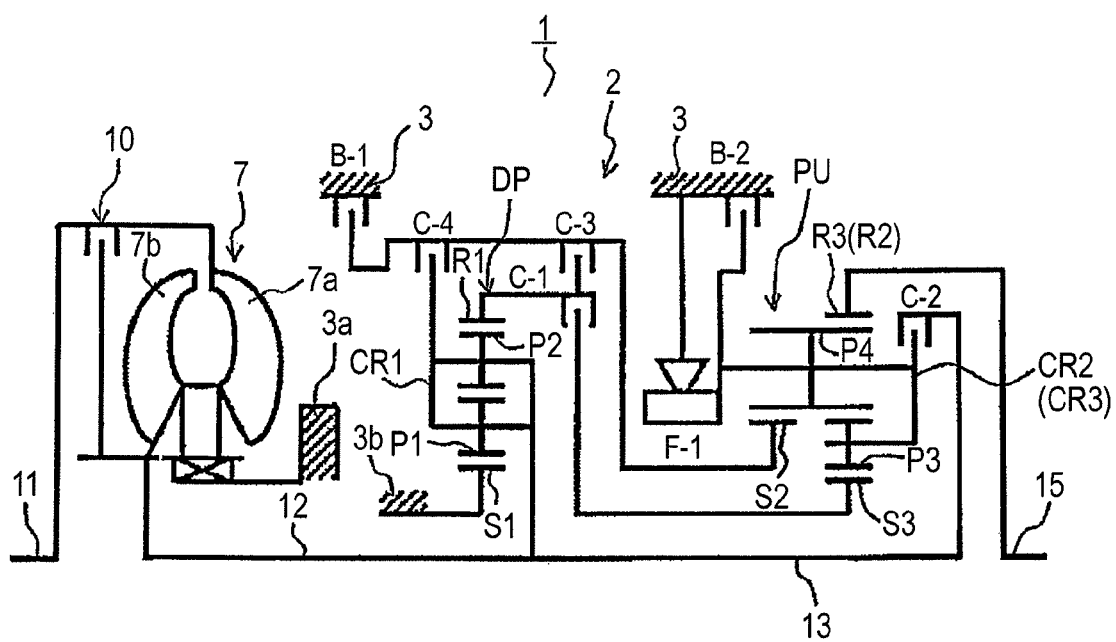
FIG. 1 is a skeleton drawing showing an automatic transmission to which the present invention can be applied.

Referring now to FIG. 1, a schematic configuration of a multispeed automatic transmission 1 (hereinafter referred to simply as "automatic transmission") to which the present invention can be applied will be described. As shown in FIG. 1, the automatic transmission 1 suitable to be used in, for example, a vehicle of FR type (front engine, rear drive) includes an input shaft 11 of the automatic transmission 1 which can be connected to an engine, not shown, and includes a torque converter 7 and a transmission mechanism 2 with an axial direction of the input shaft 11 as a center.

The torque converter 7 includes a pump impeller 7a connected to the input shaft 11 of the automatic transmission 1 and a turbine runner 7b to which the rotation of the pump impeller 7a is transmitted via working fluid, and the turbine runner 7b is connected to an input shaft 12 of the transmission mechanism 2 disposed coaxially with the input shaft 11. The torque converter 7 is provided with a lockup clutch 10 and, when the lockup clutch 10 is engaged by hydraulic control of a hydraulic control apparatus, described later, the rotation of the input shaft 11 of the automatic transmission 1 is directly transmitted to the input shaft 12 of the transmission mechanism 2.

The transmission mechanism 2 includes a planetary gear DP and a planetary gear unit PU on the input shaft 12 (and an intermediate shaft 13). The planetary gear DP is so-called a double pinion planetary gear configured in such a manner that a sun gear S1, a carrier CR1, and a ring gear R1 are provided, and the carrier CR1 includes a pinion P1 which engages the sun gear S1 and a pinion P2 which engages the ring gear R1 in a form of being engaged with respect to each other.

The planetary gear unit PU is so-called a ravigneaux type planetary gear configured in such a manner that a sun gear S2, a sun gear S3, a carrier CR2 (CR3), and a ring gear R3 (R2) are provided as four rotation elements, and the carrier CR2 includes a long pinion P4 which engages the sun gear S2 and the ring gear R3 and a short pinion P3 which engages the long pinion P4 and the sun gear S3 in a form of being engaged with respect to each other.

The sun gear S1 of the planetary gear DP is connected, for example, to a boss portion 3b extended from an oil pump body 3a fixed integrally to a transmission case 3, whereby the rotation thereof is fixed. Also, the carrier CR1 is connected to the input shaft 12 and is rotated together with the rotation of the input shaft 12 (hereinafter, referred to as "input rotation"), and is connected to a fourth clutch C-4 (frictional engagement element). In addition, the ring gear R1 performs a decelerated rotation which is decelerated from the input rotation by the fixed sun gear S1 and the carrier CR1 which performs the input rotation, and is connected to a first clutch C-1 (frictional engagement element) and a third clutch C-3 (frictional engagement element).

The sun gear S2 of the planetary gear unit PU is connected to a first brake B-1 (frictional engagement element) as a locking mechanism and is freely fixable with respect to the transmission case 3, and is connected to the fourth clutch C-4 and the third clutch C-3, whereby the input rotation of the carrier CR1 via the fourth clutch C-4 and the decelerated rotation of the ring gear R1 via the third clutch C-3 can be input freely. The sun gear S3 is connected to the first clutch C-1, so that the decelerated rotation of the ring gear R1 can be input freely.

In addition, the carrier CR2 is connected to a second clutch C-2 (frictional engagement element) to which the rotation of the input shaft 12 is input via the intermediate shaft 13, so that the input rotation can be input freely via the second clutch C-2, and is connected to a one-way clutch F-1 and a second brake B-2 (frictional engagement element) as the locking mechanism so that the rotation thereof in one direction with respect to the transmission case 3 is restrained via the one-way clutch F-1, and the rotation thereof can be fixed freely via the second brake B-2. Then, the ring gear R3 is connected to an output shaft 15 which outputs the rotation to a drive wheel, not shown.

The automatic transmission 1 configured as described above establishes a gear ratio at a transmission gear speed with a desirable step ratio by the operations of the respective clutches C-1 to C-4, the brakes B-1 to B-2, and the one-way clutch F-1 from a forward first gear to a forward eighth gear and a reverse gear as shown in a table of operation in FIG. 2. Also, by changing the grip between the respective clutches C-1 to C-4 and brakes B-1 to B-2, respective transmission controls are executed, so that two of the respective clutches C-1 to C-4 and the brakes B-1 to B-2 are engaged at the respective transmission gear speeds except for a drive at the forward first gear, and the respective transmission gear speeds are assumed. When three or more clutches and brakes are engaged in the forward first gear to the forward eighth gear and the reverse gear, a tie-up occurs in the automatic transmission 1 and hence a stall state may be assumed. However, the engagement of the three or more clutches or brakes is prevented by a hydraulic control apparatus 20 described later in detail.

[Entire Configuration of Hydraulic Control Apparatus]

Subsequently, the hydraulic control apparatus 20 of the automatic transmission according to the present invention will be described with reference to FIG. 3. In this embodiment, in order to explain the positions of the spool; the switch position or the control position, a state being on the right half as shown in FIG. 3 is referred to as "right half position" and a state being on the left half is referred to as "left half position" although there is only one spool in each valve in effect.

The hydraulic control apparatus 20 includes a strainer, an oil pump, a primary regulator valve, a secondary regulator valve, a solenoid modulator valve, a linear solenoid valve SLT, and the like not shown, for regulating and generating a hydraulic pressure mainly as various original pressures. In this embodiment, the oil pump and the primary regulator valve are combined and are shown as a line-pressure generating source (original pressure generating source) 5 for generating a line pressure $P_L$ (see FIG. 3).

Figure 3:
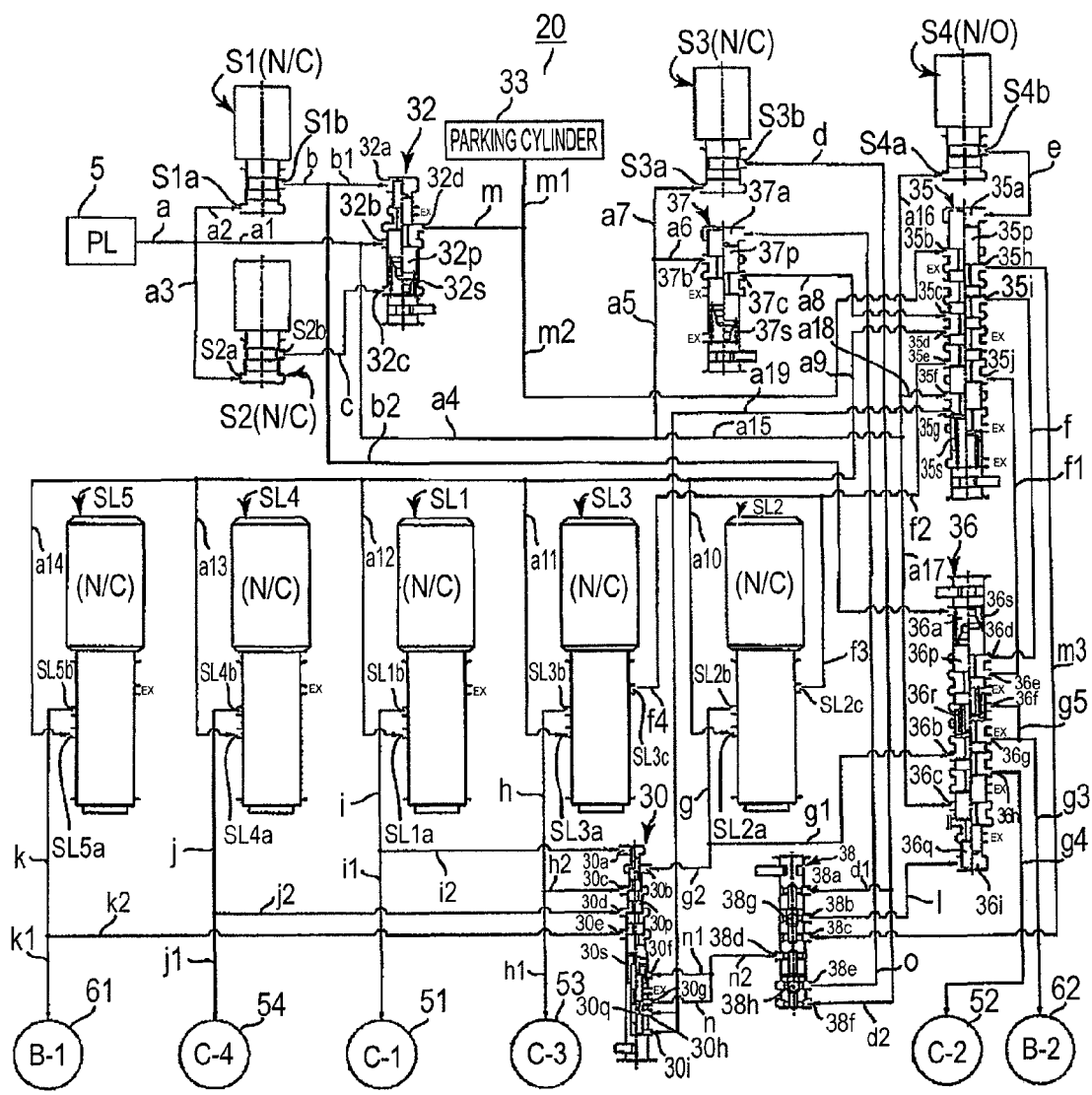
FIG. 3 is a hydraulic circuit diagram showing a hydraulic control apparatus according to the present invention.

As shown in FIG. 3, the hydraulic control apparatus 20 includes a linear solenoid valve (engagement pressure solenoid valve) SL1, a linear solenoid valve (engagement pressure solenoid valve) SL2, a linear solenoid valve (engagement pressure solenoid valve) SL3, a linear solenoid valve (engagement pressure solenoid valve) SL4, a linear solenoid valve (engagement pressure solenoid valve) SL5, a first solenoid valve S1, a second solenoid valve S2, a third solenoid valve (original pressure switch solenoid valve) S3, and a fourth solenoid valve (fail solenoid valve) S4 for electrically controlling and supplying the oil pressure. In addition, the hydraulic control apparatus 20 includes a parking switch valve 32, a parking cylinder 33, an original pressure switch valve 37, a fail-safe switch valve 35, a distribution switch valve 36, a check ball valve (shuttle valve) 38, and a fail-safe valve (simultaneous engagement signal switch valve) 30.

Solenoid valves of so-called a normally-close (N/C) type, which block an input port and an output port when not being excited (hereinafter, referred to as "OFF") and communicate the same when being excited (hereinafter, also referred to as "ON") are used as the solenoid valves other than the fourth solenoid valve S4 in the hydraulic control apparatus 20, that is, the linear solenoid valves SL1 to SL5 and the first and second solenoid valves S1, S2, and the third solenoid valve S3, and in contrast, a solenoid valve of normally-open (N/O) type is used only as the fourth solenoid valve S4.

Then, the hydraulic control apparatus 20 includes a hydraulic servo 51 which is able to engage and disengage the first clutch C-1, a hydraulic servo 52 which is able to engage and disengage the second clutch C-2, a hydraulic servo 53 which is able to engage and disengage the third clutch C-3, a hydraulic servo 54 which is able to engage and disengage the fourth clutch C-4, a hydraulic servo 61 which is able to engage and disengage the first brake B-1, and a hydraulic servo 62 which is able to engage and disengage the second brake B-2 on the basis of engagement pressures regulated and supplied respectively by the linear solenoid valves SL1 to SLS.

[Detailed Configuration of Hydraulic Control Apparatus]

As shown in FIG. 3, in the first and second solenoid valves S1, S2 of the normally-close (N/C) type, input ports S1$a$, S2$a$ receive an input of the line pressure $P_L$ (original pressure) respectively via oil channels a, a2 and an oil channel a3 and, when being excited (turned ON), first and second hydraulic oil chambers 32$a$, 32$c$ of the parking switch valve 32 receive outputs of signal pressures $P_{S1}$, $P_{S2}$ from output ports S1$b$, S2$b$ respectively via oil channels b, b1, and an oil channel c. The signal pressure $P_{S1}$ from the output port S1$b$ is input also to a first hydraulic oil chamber 36$a$ of the distribution switch valve 36, described later, via the oil channel b and an oil channel b2. The line pressure $P_L$ is also input to an input port 32$b$ of the parking switch valve 32 via the oil channel a and an oil channel a1 and to an input port 37$b$ of the original pressure switch valve 37, described later, via the oil channels a, a1, and oil channels a4, a5, a6. Further, the line pressure $P_L$ is also input to an input port S3$a$ of the third solenoid valve S3 via the oil channels a, a1, a4, a5, and an oil channel a7, to the input port S4$a$ of the fourth solenoid valve S4 via the oil channels a, a1, a4, and oil channels a15, a16, to a hydraulic oil chamber 36$c$ of the distribution switch valve 36 via the oil channels a, a1, a4, a15, and an oil channel a17, and to an input port 35$f$ of the fail-safe switch valve 35, described later, via the oil channels a, a1, a4, a15, and an oil channel a18. The first, second, third, and fourth solenoid valves S1, S2, S3, and S4 and the signal pressures thereof are described using the same reference numerals S1, S2, S3, S4 as described above. The linear solenoid valves SL1 to SL5 and the engagement pressures thereof are described using the same reference numerals SL1 to SL5. It is applied also to other valves.

The parking switch valve 32 includes a single spool 32$p$ and a spring 32$s$ installed in a contracted state on one end side of the spool 32$p$ for urging the spool 32$p$ upward in the drawing, and also includes the first hydraulic oil chamber 32$a$ arranged on the one end of the spool 32$p$ and applied with the signal pressure $P_{S1}$ from the output port S1$b$ of the first solenoid valve S1, and the second hydraulic oil chamber 32$c$ arranged on the other end of the spool 32$p$ and applied with the signal pressure $P_{S2}$ from the output port S2$b$ of the second solenoid valve S2.

In addition, the parking switch valve 32 includes an exhaust port EX, the input port 32$b$ to be supplied with the line pressure $P_L$, and an output port 32$d$ brought into communication with, or blocked from the input port 32$b$ according to the movement of the spool 32$p$. The output port 32$d$ is communicated with the parking cylinder 33 of a parking device via oil channels m, m1. Then, the spool 32$p$ includes a large-diameter land portion on the lower side in the drawing, and a small-diameter land portion on the upper side in the drawing, and a narrowed portion is formed and an oil chamber is formed between the large-diameter land portion and the small-diameter land portion. The spool 32$p$ is configured to be urged and locked by a force stronger than the urging force of the spring 32$s$ in a direction opposite from the urging direction of the spring 32$s$, that is, downward in the drawing due to the difference in outer diameter between the large-diameter land portion and the small diameter land portion, that is, the difference in area presented to the pressure and output the line pressure $P_L$ from the output port 32$d$ as a parking release pressure when the spool 32$p$ is in the right half position where it is moved downward against the urging force of the spring 32$s$ and the line pressure $P_L$ input from the input port 32$b$ is applied to the narrowed portion. The output port 32$d$ is configured to be guided to an input port 38$c$ of the check ball valve 38, described later, via the oil channel m, an oil channel m2, the fail-safe switch valve 35, described later, and an oil channel m3.

Figure 5:
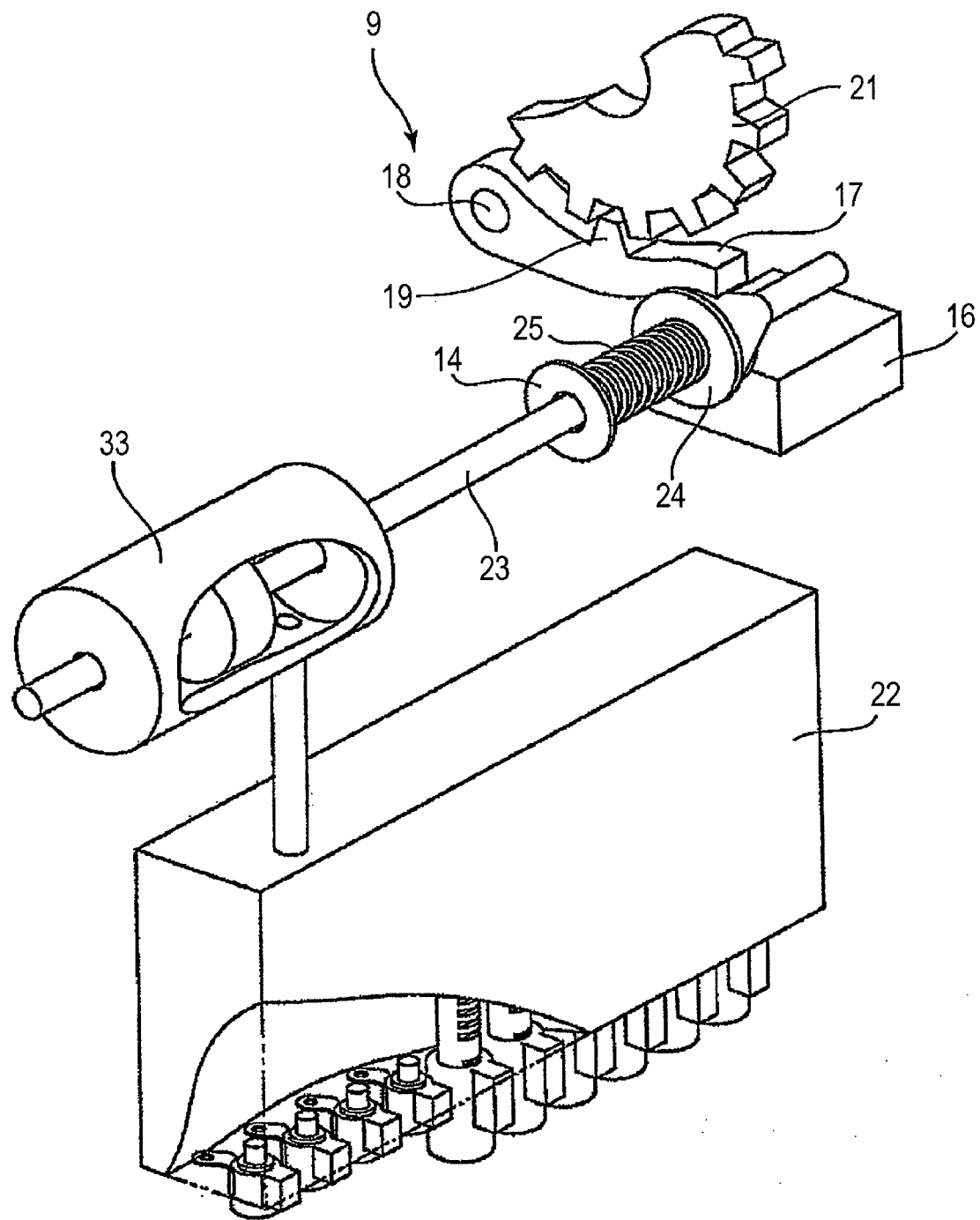
FIG. 5 is a schematic diagram showing a parking device.

Referring now to FIG. 5, a parking device 9 activated by the parking cylinder 33 will be described. The parking device 9 includes the parking cylinder 33, a parking rod 23, a support 16, a parking pole 17, and a parking gear 21 as shown in the same drawing. The parking cylinder 33 is connected to a valve body 22, and the parking rod 23 penetrates therethrough so as to be movable in the axial direction on a proximal end side thereof. The parking rod 23 includes a conical wedge 24 loosely fitted thereon so as to be movable in the axial direction on a distal end side thereof, and a spring 25 is arranged between a flange portion 14 fixed to a case (not shown) and the wedge 24. The support 16 is arranged below the distal end side of the parking rod 23 so as to allow the wedge 24 to be inserted into and retracted from a portion between the support 16 and the parking pole 17. The parking pole 17 is arranged so as to be swingable substantially in the vertical direction about a shaft 18 on a proximal end side, and is formed with a claw portion 19 which is disengageably engageable with the parking gear 21 fixed to an output shaft (not shown) of the automatic transmission formed so as to protrude from an upper side of a midsection thereof.

When the parking release pressure (line pressure $P_L$) is applied to the parking cylinder 33 from the output port 32$d$ of the parking switch valve 32, the parking rod 23 is moved toward the parking cylinder 33 against the urging force of the spring 25, moves the wedge 24 apart from between the support 16 and the parking pole 17, and causes the parking pole 17 to swing downward to disengage the claw portion 19 from the parking gear 21, whereby a parking release state is assumed. When the parking release pressure from the parking switch valve 32 is blocked, and a hydraulic pressure applied to the parking cylinder 33 is drained, the parking rod 23 is moved toward the parking pole 17 due to the urging force of the spring 25, causes the wedge 24 to be inserted between the support 16 and the parking pole 17, causes the parking pole 17 to swing upward to engage the claw portion 19 with the parking gear 21, whereby a parking state is assumed.

Also, as shown in FIG. 3, in the parking switch valve 32, in a state in which the signal pressure $P_{S1}$ is not applied to the first hydraulic oil chamber 32$a$ from the output port S1$b$ of the first solenoid valve S1, the spool 32$p$ is moved upward in the drawing by the urging force of the spring 32$s$ and takes the left half position, whereby an output of the parking release pressure from the output port 32$d$ to the parking cylinder 33 is blocked. Also, in the parking switch valve 32, in a state in which the signal pressure $P_{S2}$ from the output port S2$b$ of the second solenoid valve S2 is not applied to the second hydraulic oil chamber 32$c$ and the signal pressure $P_{S1}$ from the output port S1$b$ of the first solenoid valve S1 is input to the first hydraulic oil chamber 32$a$, or in a state in which the signal pressure $P_{S2}$ is not applied to the second hydraulic oil chamber 32$c$ and the line pressure $P_L$ is continuously applied to the input port 32$b$, the spool 32$p$ is moved downward in the drawing and takes the right half position, so that the parking release pressure is supplied from the output port 32$d$ to the parking cylinder 33.

In contrast, an input port S3$a$ of the third solenoid valve (original pressure switch solenoid valve) S3 of the normally-close type receives an input of a line pressure $P_L$ via the oil channel a7 and, in an excited state (ON), is configured to produce an output of the line pressure $P_L$ as a signal pressure (original signal pressure) $P_{S3}$ from an output port S3*b* to a hydraulic oil chamber 37*a* of the original pressure switch valve 37 via an oil channel d, the check ball valve 38, and an oil channel o, and block the signal pressure $P_{S3}$ in a non-excited state (OFF). The signal pressure $P_{S3}$ from the third solenoid valve S3 is configured to be output also to an input port 38*a* of the check ball valve 38, described later, via the oil channel d and an oil channel d1.

The original pressure switch valve 37 includes a spool 37*p* and a spring 37*s* configured to urge the spool 37*p* upward in the drawing, is arranged so as to be interposed between the oil channel a6 and an oil channel a8 which supply the line pressure $P_L$ from the line-pressure generating source 5 to the fail-safe switch valve 35, described later, and includes a hydraulic oil chamber 37*a* to which the signal pressure $P_{S3}$ or a simultaneous engagement signal pressure $P_{FSV}$ from the fail-safe valve 30, described later, can be input via the check ball valve 38 and the oil channel o, the input port 37*b* configured to input the line pressure $P_L$ via the oil channel a6, and an output port 37*c* configured to output the line pressure $P_L$ of the input port 37*b* to the oil channel a8 in the left half position. The spool 37*p* is moved downward in the drawing and takes take the right half position (blocked position) upon receipt of an input of the signal pressure $P_{S3}$ or the simultaneous engagement signal pressure $P_{FSV}$ to the hydraulic oil chamber 37*a*, and is moved upward in the drawing by the urging force of the spring 37*s* and takes the left half position (supply position) in other cases.

The input port S4*a* of the fourth solenoid valve (fail solenoid valve) S4 of the normally-open type receives an input of the line pressure $P_L$ via the oil channel a16 and, in the non-excited state (OFF), is configured to produce an output of the line pressure $P_L$ as a signal pressure (fail signal pressure) $P_{S4}$ from an output port S4*b* to a hydraulic oil chamber 35*a* of the fail-safe switch valve 35 via an oil channel e, and block the signal pressure $P_{S4}$ in the excited state (ON).

The fail-safe switch valve 35 described above includes a spool 35*p* and a spring 35*s* configured to urge the spool 35*p* upward in the drawing, and includes the hydraulic oil chamber 35*a*, an input port 35*b* connected to the output port 32*d* of the parking switch valve 32 via the oil channels m, m2, an input port 35*c* connected to the output port 37*c* of the original pressure switch valve 37 via the oil channel a8, an output port 35*d* connected to input ports SL1*a* to SL5*a* of the linear solenoid valves SL1 to SL5, described later in detail, via an oil channel a9, an output port 35*e* connected to exhaust ports SL2*c*, SL3*c* of the linear solenoid valves SL2, SL3, described later, via an oil channel f2, the input port 35*f* configured to receive an input of the line pressure $P_L$ described above via the oil channel a18, an output port 35*g* connected to an input port 30*h* and a hydraulic oil chamber 30*i* of the fail-safe valve 30, described later, via an oil channel a19, an output port 35*h* connected to the input port 38*c* of the check ball valve 38, described later, via the oil channel m3, an output port 35*i* connected to an input port 36*d* of the distribution switch valve 36, described later, via an oil channel f, an input port 35*j* connected to an output port 36*e* of the distribution switch valve 36, described later, via an oil channel f1, and exhaust ports EX. The spool 35*p* is moved downward in the drawing and takes the right half position when the hydraulic oil chamber 35*a* receives an input of the signal pressure $P_{S4}$, and is moved upward in the drawing by the urging force of the spring 35*s* and takes the left half position in other cases.

The distribution switch valve 36 described above includes a first spool 36*p*, a spring 36*s* configured to urge the first spool 36*p* downward in the drawing, a second spool 36*q*, and a spring 36*r* disposed between the first spool 36*p* and the second spool 36*q*, and also includes the first hydraulic oil chamber 36*a* configured to receive an input of the signal pressure $P_{S1}$ coming from the output port S1*b* of the first solenoid valve S1 via the oil channel b2 in a branched manner, an input port 36*b* configured to receive an input of an engagement pressure $P_{SL2}$ coming from the output port SL2*b* of the linear solenoid valve SL2, the hydraulic oil chamber 36*c* configured to receive an input of the line pressure $P_L$ via the oil channel a17, the input port 36*d* configured to receive an input of a hydraulic pressure coming from the output port 35*i* of the fail-safe switch valve 35 at the time of solenoid-all-off fail via the oil channel f, the output port 36*e* configured to output the hydraulic pressure from the output port 35*i*, which is input to the input port 36*d* when the first spool 36*p* takes the right half position, to the input port 35*j* via the oil channel f1, an output port 36*g* configured to output the engagement pressure $P_{SL2}$ from the linear solenoid valve SL2, which is input to the input port 36*b*, to the hydraulic servo 62 via the oil channel g3 when the second spool 36*q* takes the left half position, a hydraulic oil chamber 36*f* configured to urge the second spool 36*q* to the left half position by inputting the engagement pressure $P_{SL2}$, which is output to the oil channel g3, an output port 36*h* configured to output the engagement pressure $P_{SL2}$ to the hydraulic servo 52 via an oil channel g4 when the second spool 36*q* takes the right half position, and a second hydraulic oil chamber 36*i* configured to receive an input of the parking release pressure coming via the parking switch valve 32, the fail-safe switch valve 35, and the oil channel m3 described above or an input of the signal pressure $P_{S3}$ coming from the output port S3*b* of the third solenoid valve S3 via the oil channel d1 via the check ball valve 38 and an oil channel 1.

The second hydraulic oil chamber 36*i* receives an input of the parking release pressure (or the signal pressure $P_{S3}$) in a state in which the first hydraulic oil chamber 36*a* does not receive an input of the signal pressure $P_{S1}$ from the output port S1*b* and in the ranges other than a parking range, the first spool 36*p* and the second spool 36*q* of the distribution switch valve 36 are moved upward in the drawing and take the right half position. The distribution switch valve 36 includes a small-diameter land portion formed at a lowermost position in the drawing and a large-diameter land portion formed right above the small-diameter land portion with the intermediary of a narrowed portion on the second spool 36*q*, and is configured to allow an input of the line pressure $P_L$ to receive to an oil chamber provided at the narrowed portion from the hydraulic oil chamber 36*c*. Therefore, the distribution switch valve 36 is configured in such a manner that the first spool 36*p* and the second spool 36*q* are moved upward and take the right half position against the urging forces of the springs 36*s*, 36*r*, the hydraulic oil chamber 36*c* receives an input of the line pressure $P_L$, and the first spool 36*p* and the second spool 36*q* are locked at an upper position on the basis of the difference in areas presented to the pressure between the upper large-diameter land portion and the lower small-diameter land portion.

When the first hydraulic oil chamber 36*a* receives an input of the signal pressure $P_{S1}$ from the output port S1*b* in the locked state, the urging force generated by the signal pressure $P_{S1}$ overcomes the urging force of the lock in cooperation with the urging force generated by the spring 36*s*, and hence the first spool 36*p* and the second spool 36*q* are moved (restored) downward in the drawing and take the left half position. Also, when an output of the engagement pressure $P_{SL2}$ is produced from the linear solenoid valve SL2 (in an R-range, at the time of an engine brake with a first gear speed) and an output of the engagement pressure $P_{SL2}$ is produced to the hydraulic servo 62 via the oil channel g3 in a state in which the second spool 36q takes the left half position, the hydraulic oil chamber 36f between the first spool 36p and the second spool 36q receives an input of the engagement pressure $P_{SL2}$, which overcomes the parking release pressure of the second hydraulic oil chamber 36i in cooperation with the urging force of the spring 36r, and hence the second spool 36q is locked at a lower position and, even when the first solenoid valve S1 is turned OFF in this state, and the first hydraulic oil chamber 36a does not receive an input of the signal pressure $P_{S1}$, only the first spool 36p is moved upward and the second spool 36q remains at the lower position.

The check ball valve (shuttle valve) 38 described above includes the input port 38a configured to receive an input of the signal pressure $P_{S3}$ from the output port S3b of the third solenoid valve S3 via the oil channel d1, the input port 38c configured to receive an input of the parking release pressure from the parking switch valve 32 via the oil channel m3, an output port 38b connected to the second hydraulic oil chamber 36i of the distribution switch valve 36 via the oil channel 1, and a check ball 38g interposed among the input port 38a, the input port 38c, and the output port 38b. The check ball 38g is rolled by being pressed by a larger one of the signal pressure $P_{S3}$ input to the input port 38a and the parking release pressure input to the input port 38c, thereby establishing a communication with the output port 38b, that is, the larger one of the signal pressure $P_{S3}$ and the parking release pressure is output from the output port 38b.

The check ball valve 38 described above also includes an input port 38d configured to receive an input of the simultaneous engagement signal pressure $P_{FSV}$, described later, via an oil channel n2, an input port 38f configured to receive an input of the signal pressure $P_{S3}$ from the output port S3b of the third solenoid valve S3 via an oil channel d2, an output port 38e connected to the hydraulic oil chamber 37a of the original pressure switch valve 37 via the oil channel o, and a check ball 38h interposed among the input port 38d, the input port 38f, and the output port 38e. The check ball 38h is rolled by being pressed by a larger one of the simultaneous engagement signal pressure $P_{FSV}$ input to the input port 38d and the signal pressure $P_{S3}$ input to the input port 38f, thereby establishing communication with the output port 38e, that is, the larger one of the simultaneous engagement signal pressure $P_{FSV}$ and the signal pressure $P_{S3}$ is output from the output port 38e.

In contrast, the linear solenoid valve (engagement pressure solenoid valve) SL1 described above includes an input port SL1a configured to receive an input of the line pressure $P_L$ from the output port 35d of the fail-safe switch valve 35 via the oil channel a9 and an oil channel a12 in a normal state, an output port SL1b configured to regulate the line pressure $P_L$ and output the same to the hydraulic servo 51 as an engagement pressure $P_{SL1}$ via an oil channels i, i1 and output the same to an oil chamber 30a of the fail-safe valve 30, described later, via an oil channel i2 when being excited, and an exhaust port EX configured to drain an engagement pressure $P_{C1}$ of the hydraulic servo 51.

The linear solenoid valve (engagement pressure solenoid valve) SL2 described above includes the input port SL2a configured to receive an input of the line pressure $P_L$ from the output port 35d of the fail-safe switch valve 35 via the oil channel a9 and an oil channel a10 in the normal state, an output port SL2b configured to regulate the line pressure $P_L$, and output the same to the input port 36b of the distribution switch valve 36 via oil channels g, g1, and output the same to an oil chamber 30b of the fail-safe valve 30, described later, via an oil channel g2 when being excited, and the exhaust port SL2c configured to communicated with the output port 35e of the fail-safe switch valve 35 via the oil channel f2 and an oil channel f3. When discharging the engagement pressure $P_{SL2}$ in the normal state, the engagement pressure $P_{SL2}$ is drained from the exhaust port EX via the exhaust port SL2c and the output port 35e. At the time of the solenoid-all-off fail, described later, the line pressure $P_L$ is reversely input from the output port 35e as a reverse input pressure via the oil channels f2, f3.

The linear solenoid valve (engagement pressure solenoid valve) SL3 described above includes the input port SL3a configured to receive an input of the line pressure $P_L$ from the output port 35d of the fail-safe switch valve 35 via the oil channel a9 and an oil channel a11 in the normal state, an output port SL3b configured to regulate the line pressure $P_L$ and output the same to the hydraulic servo 53 as an engagement pressure $P_{SL3}$ via oil channels h, h1 and output the same to an oil chamber 30c of the fail-safe valve 30, described later, via an oil channel h2 when being excited, and the exhaust port SL3c configured to communicate with the output port 35e of the fail-safe switch valve 35 via the oil channel f2 and an oil channel f4. When discharging the engagement pressure $P_{SL3}$ in the normal state, the engagement pressure $P_{SL3}$ is drained from the exhaust port EX via the exhaust port SL3c and the output port 35e. At the time of the solenoid-all-off fail, described later, the line pressure $P_L$ is reversely input from the output port 35e as the reverse input pressure via the oil channels f2, f4.

The linear solenoid valve (engagement pressure solenoid valve) SL4 described above includes the input port SL4a configured to receive an input of the line pressure $P_L$ from the output port 35d of the fail-safe switch valve 35 via the oil channel a9 and an oil channel a13 in the normal state, an output port SL4b configured to regulate the line pressure $P_L$ and output the same to the hydraulic servo 54 as an engagement pressure $P_{SL4}$ via oil channels j, j1 and output the same to an oil chamber 30d of the fail-safe valve 30, described later, via an oil channel j2 when being excited, and an exhaust port EX configured to drain the engagement pressure $P_{C4}$ of the hydraulic servo 54 mainly.

The linear solenoid valve (engagement pressure solenoid valve) SL5 described above includes the input port SL5a configured to receive an input of the line pressure $P_L$ from the output port 35d of the fail-safe switch valve 35 via the oil channel a9 and an oil channel a14 in the normal state, an output port SL5b configured to regulate the line pressure $P_L$ and output the same to the hydraulic servo 61 as an engagement pressure $P_{SL5}$ via oil channels k, k1 and output the same to an oil chamber 30e of the fail-safe valve 30, described later, via an oil channel k2 when being excited, and an exhaust port EX configured to drain an engagement pressure $P_{B1}$ of the hydraulic servo 61 mainly.

In the embodiments described above, a reverse input oil channel extending through the distribution switch valve 36 to the linear solenoid valves SL2, SL3 is configured by a route of the oil channels f, f1, f2, f3, f4.

Figure 6:
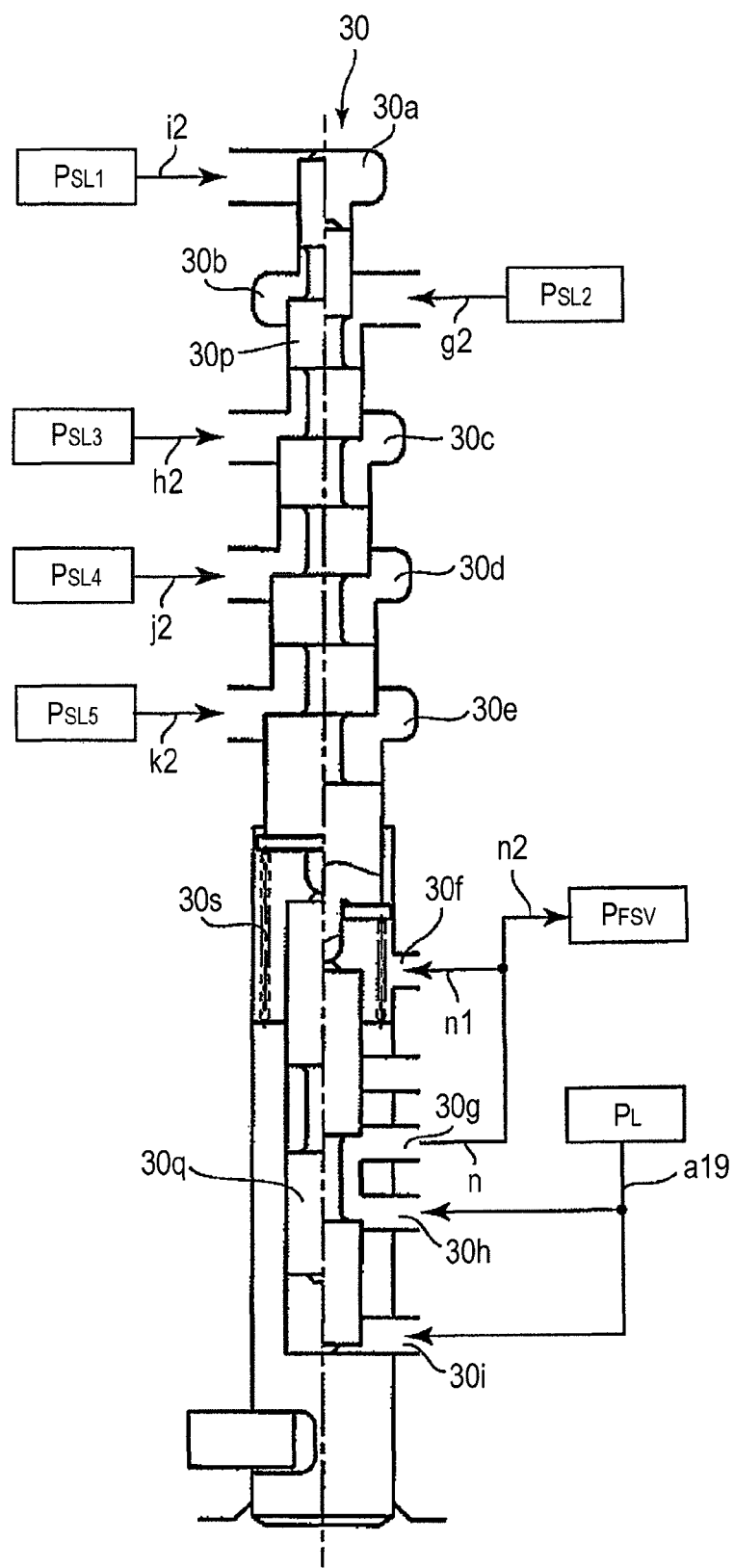
FIG. 6 is an enlarged view of a fail-safe valve.

As shown in FIG. 3 and FIG. 6, the fail-safe valve (simultaneous engagement signal switching valve) 30, which is a principal portion of the present invention, includes a first spool 30p, a spring (urging member) 30s configured to urge the first spool 30p upward in the drawing and the second spool 30q, the oil chamber 30a being connected to the output port SL1b of the linear solenoid valve SL1 described above and being able to receive an input of the engagement pressure $P_{SL1}$, the oil chamber 30b being connected to the output port SL2b of the linear solenoid valve SL2 described above and being able to receive an input of the engagement pressure $P_{SL1}$, the oil chamber 30c being connected to the output port SL3*b* of the linear solenoid valve SL3 described above and receiving an input of the engagement pressure $P_{SL3}$, the oil chamber 30*d* being connected to the output port SL4*b* of the linear solenoid valve SL4 described above and being able to receive an input of the engagement pressure $P_{SL4}$, the oil chamber 30*e* being connected to the output port SL5*b* of the linear solenoid valve SL5 described above and being able to receive an input of the engagement pressure $P_{SL5}$, the hydraulic oil chamber (opposed oil chamber) 30*i* configured to receive an input of the line pressure $P_L$ via the oil channel a19, the input port 30*h* configured to receive an input of the line pressure $P_L$ via the same oil channel a19, an output port 30*g* being communicated with the input port 30*h* when a second spool 30*q* takes the right half position to output the line pressure $P_L$ as the simultaneous engagement signal pressure $P_{FSV}$ to an oil channel n, and a lock oil chamber 30*f* configured to lock the second spool 30*q* to a lower position when receiving an input of the simultaneous engagement signal pressure $P_{FSV}$ via an oil channel n1.

A land portion of the first spool 30*p* of the fail-safe valve 30 described above on an upper side in FIG. 6 has a smallest diameter, and the diameters of the land portions are increased step-by-step as it goes downward in the drawing. In other words, the five oil chambers 30*a* to 30*e* are configured in such a manner that a sum of areas presented to the pressure in arbitrary two oil chambers among them is equal to the area presented to the pressure of the hydraulic oil chamber 30*i* which receives an input of the line pressure $P_L$. In a state in which the engagement pressures $P_{RA}$ to $P_{SL5}$ are input to two of the five oil chambers 30*a* to 30*e*, the two engagement pressures are substantially balanced with the line pressure $P_L$ of the hydraulic oil chamber 30*i*, and the first spool 30*p* is urged upward in the drawing by an urging force of the spring 30*s* and is maintained at the left half position. In this case, the second spool 30*q* is urged upward in the drawing by the line pressure $P_L$ input to the hydraulic oil chamber 30*i*, takes the left half position (non-output position), and urges the first spool 30*p* upward in the drawing.

When three or more of the five oil chambers 30*a* to 30*e* described above receive inputs of the engagement pressures $P_{SL1}$ to $P_{SL5}$, the line pressure $P_L$ input to the hydraulic oil chamber 30*i* and the urging force of the spring 30*s* are defeated by the actions of the engagement pressures of the three oil chambers, so that the first spool 30*p* and the second spool 30*q* take the right half position (output position). Then, the line pressure $P_L$ input to the input port 30*h* is output to the oil channels n, n1, n2 from the output port 30*g* as the simultaneous engagement signal pressure $P_{FSV}$ which indicates that the three clutches or brakes are going to be engaged simultaneously. Then, since the lock oil chamber 30*f* receives an input of the simultaneous engagement signal pressure $P_{FSV}$ via the oil channel n1, the second spool 30*q* is locked at a lower position of the drawing, so that the five oil chambers 30*a* to 30*e* described above do not receive inputs of the engagement pressures $P_{SL1}$ to $P_{SL5}$ any longer, and the second spool 30*q* is maintained at the right half position even when the first spool 30*p* takes the left half position by the urging force of the spring 30*s*.

[Configuration of Command System]

The hydraulic control apparatus 20 includes a first computer (main ECU) and a second computer (sub ECU) as two ECUs, not shown. The first computer constitutes a first command system by being connected to the first, second, fourth solenoid valves S1, S2, S4 and the linear solenoid valves SL1 to SL5, and the first, second, fourth solenoid valves S1, S2, S4 and the linear solenoid valves SL1 to SL5 are controlled by the first command system by the first computer. The second computer constitutes a second command system by being connected only to the third solenoid valve S3, and the third solenoid valve S3 is controlled by the second command system by the second computer. The first command system and the second command system are configured as separate systems, and are isolated electrically (wiring, transmission and receipt of signals). In other words, even when a problem occurs in one of them, the other one is prevented from being affected by the problem.

In other words, the first command system including the first computer is used in the normal state and performs control of a shift range or transmission at the respective transmission gear speeds on the basis of an operative input of a shift lever in the normal state. At the time of the failure of the first command system caused by a powering down of the first computer, a disconnection of wirings, falling-off of a connector, or the like in the first command system, the second command system of the second computer is driven irrespective of the failure, and fail-safe control using the third solenoid valve S3 can be performed on the basis of the selecting operation of the shift lever.

[Operation in Normal State]

Subsequently, an operation of the hydraulic control apparatus 20 described above in the normal state will be described with reference to FIG. 3 and FIG. 4.

In other words, in the P-range (non-traveling range, parking range) on the basis of the operation of the shift lever (not shown) by a driver, for example, the first solenoid valve S1 is turned OFF and hence the signal pressure $P_{S1}$ is not output from the output port S1*b*, the second and fourth solenoid valves S2, S4 are turned ON, an output of the signal pressure $P_{S2}$ is produced from the output port S2*b* of the second solenoid valve S2, and no output of the signal pressure $P_{S4}$ is produced from the output port S4*b* of the fourth solenoid valve S4 which is the normally-open type as shown in FIG. 3 and FIG. 4.

In the state of the P-range, in the parking switch valve 32, the signal pressure $P_{S1}$ does not act on the first hydraulic oil chamber 32*a* and the signal pressure $P_{S2}$ acts on the second hydraulic oil chamber 32*c*, so that the spool 32*p* takes the left half position in cooperation with the urging force of the spring 32*s*, and the line pressure $P_L$ is blocked at the input port 32*b*. Accordingly, when the parking release pressure from the parking switch valve 32 is blocked and the parking rod 23 is moved toward the parking pole 17 by the urging force of the spring 25, the wedge 24 is inserted between the support 16 and the parking pole 17 and the claw portion 19 engages the parking gear 21, so that the parking cylinder 33 is brought into the parking state.

The third solenoid valve S3 remains in the OFF state, that is, no control is performed. Accordingly, the original pressure switch valve 37 is maintained at the left half position by the urging force of the spring 37*s*, and the line pressure $P_L$ input to the input port 37*b* via the oil channel a6 is output from the output port 37*c* to the input port 35*c* of the fail-safe switch valve 35 via the oil channel a8.

Also, with the fourth solenoid valve S4 turned ON, the signal pressure $P_{S4}$ from the output port S4*b* does not act on the hydraulic oil chamber 35*a* of the fail-safe switch valve 35, and hence the spool 35*p* takes the left half position, an output of the line pressure $P_L$ acting on the input port 35*c* is produced from the output port 35*d* to all the linear solenoid valves SL1 to SL5. However, since all the linear solenoid valves SL1 to SL5 are in the OFF state, outputs of the engagement pressures $P_{SL1}$ to $P_{SL5}$ are not produced.

Subsequently, when the shift lever is operated to the R-range (reverse range), the first solenoid valve S1 is turned ON and an output of the signal pressure $P_{S1}$ is produced from the output port S1$b$, and hence the signal pressure $P_{S1}$ acts on the first hydraulic oil chamber 32$a$ of the parking switch valve 32. Therefore, the spool 32$p$ takes the right half position against the urging force of the spring 32$s$, and an output of the line pressure $P_L$ of the input port 32$b$ is produced from the output port 32$d$ as the parking release pressure. Therefore, the parking rod 23 is moved toward the parking cylinder 33 against the urging force of the spring 25, and the wedge 24 is moved apart from between the support 16 and the parking pole 17 to disengage the claw portion 19 from the parking gear 21, whereby the parking release state is assumed. Then, the parking switch valve 32 having the spool 32$p$ taking the right half position is locked to the right half position due to the difference in areas presented to the pressure between the large-diameter land portion and the small-diameter land portion. The first solenoid valve S1 turned ON here may be turned OFF after the elapse of a predetermined time, such as, for example, several seconds.

As described above, the third solenoid valve S3 is turned OFF, the fourth solenoid valve S4 remains in the ON state, the signal pressure $P_{S3}$ from the output port S3$b$ does not act on the hydraulic oil chamber 37$a$ of original pressure switch valve 37, and the spool 37$p$ takes the left half position. Therefore, an output of the line pressure $P_L$ acting on the input port 37$b$ is produced from the output port 37$c$ to the input port 35$c$ of the fail-safe switch valve 35 and in the fail-safe switch valve 35 on the other hand, the signal pressure $P_{S4}$ from the output port S4$b$ does not act on the hydraulic oil chamber 35$a$, and the spool 35$p$ takes the left half position, so that an output of the line pressure $P_L$ acting on the input port 35$c$ is produced from the output port 35$d$ to all the linear solenoid valves SL1 to SL5.

Then, since the linear solenoid valves SL2, SL4 are turned ON, an output of the engagement pressure $P_{SL2}$ is produced from the output port SL2$b$ to the input port 36$b$ of the distribution switch valve 36. However, since the first solenoid valve S1 is turned ON, an output of the signal pressure $P_{S1}$ is produced to the first hydraulic oil chamber 36$a$ of the distribution switch valve 36, and since the first spool 36$p$ and the second spool 36$q$ take the left half positions, the engagement pressure $P_{SL2}$ is supplied from the input port 36$b$ to the hydraulic servo 62 via the output port 36$g$, whereby the second brake B-2 is locked. Simultaneously, the line pressure $P_L$ from the output port 35$d$ of the fail-safe switch valve 35 is regulated and output from the output port SL4$b$ to the hydraulic servo 54 as the engagement pressure $P_{SL4}$ by the ON operation of the linear solenoid valve SL4 described above, so that the fourth clutch C-4 is engaged. Therefore, the reverse gear is achieved in cooperation with the locking of the second brake B-2 described above. In this state, in the fail-safe valve 30, the oil chamber 30$b$ receives an input of the engagement pressure $P_{SL2}$ and the oil chamber 30$d$ receives an input of the engagement pressure $P_{SL4}$. However, the left half position is maintained by the line pressure $P_L$ acting on the hydraulic oil chamber 30$i$ and the urging force of the spring 30$s$, so that an output of the simultaneous engagement signal pressure $P_{FSV}$ does not occur.

In addition, when the shift lever is operated to an N-range (neutral range), in the same manner as in the case of the R-range, the parking release state is assumed on the basis of the fact that the parking switch valve 32 takes the right half position by the turning ON of the first solenoid valve S1. Then, the third solenoid valve S3 is turned OFF, and the fourth solenoid valve S4 is turned ON, so that the original pressure switch valve 37 and the fail-safe switch valve 35 take the left half positions and an output of the line pressure $P_L$ to all the linear solenoid valves SL1 to SL5 is produced. In this case, in the same manner as the P-range, all the linear solenoid valves SL1 to SL5 are turned OFF, and outputs of the engagement pressures $P_{SL1}$ to $P_{SL5}$ are not produced, and hence the neutral state is assumed.

Then, in the forward first gear (when start moving forward) in the forward range when the shift lever is at a D-range (drive range), the first solenoid valve S1 is turned OFF and an output of the signal pressure $P_{S1}$ from the output port S1$b$ is not produced. However, as described above, since the parking switch valve 32 is locked at the right half position by the difference in areas presented to the pressure between the large-diameter land portion and the small-diameter land portion as described above, the parking release state is assumed.

In the same manner, the third solenoid valve S3 is turned OFF, and the fourth solenoid valve S4 is turned ON, so that the original pressure switch valve 37 and the fail-safe switch valve 35 take the left half positions and an output of the line pressure $P_L$ to all the linear solenoid valves SL1 to SL5 is produced. Here, since the linear solenoid valve SL1 is turned ON, the engagement pressure $P_{SL1}$ is supplied from the output port SL1$b$ to the first clutch C-1 to engage the first clutch C-1, so that the forward first gear is achieved in cooperation with the locking of the one way clutch F-1. In this state, in the fail-safe valve 30, the oil chamber 30$a$ receives an input of the engagement pressure $P_{SL1}$. However, the left half position is maintained by the line pressure $P_L$ acting on the hydraulic oil chamber 30$i$ and the urging force of the spring 30$s$, so that an output of the simultaneous engagement signal pressure $P_{FSV}$ does not occur.

At the time of the engine brake with the forward first gear, in the same manner as in the case of the forward first gear in the forward range, it is a state in which an output of the line pressure $P_L$ to all the linear solenoid valves SL1 to SL5 is produced and, in this state, both the linear solenoid valves SL1, SL2 are turned ON. Therefore, in the linear solenoid valve SL1, the engagement pressure $P_{SL1}$ is supplied to the hydraulic servo 51 from the output port SL1$b$ to engage the first clutch C-1.

The linear solenoid valve SL2 produces an output of the engagement pressure $P_{SL2}$ to the input port 36$b$ of the distribution switch valve 36 from the output port SL2$b$. At this time, in the distribution switch valve 36, the second hydraulic oil chamber 36$i$ receives an input of the parking release pressure via the oil channels m, m2, the fail-safe switch valve 35, the oil channel m3, and the check ball valve 38 as described above. However, the first solenoid valve S1 is turned ON, and the first hydraulic oil chamber 36$a$ receives an input of the signal pressure $P_{S1}$ from the first solenoid valve S1 via the oil channels b, b2, so that the left half position is assumed. Therefore, the engagement pressure $P_{SL2}$ is supplied from the input port 36$b$ to the hydraulic servo 62 via the output port 36$g$, so that the second brake B-2 is locked. Accordingly, the engine brake with the forward first gear is assumed in cooperation with the engagement of the first clutch C-1. In this state, in the fail-safe valve 30, the oil chamber 30$a$ receives an input of the engagement pressure $P_{SL1}$ and the oil chamber 30$b$ receives an input of the engagement pressure $P_{SL2}$. However, the left half position is maintained by the line pressure $P_L$ acting on the hydraulic oil chamber 30$i$ and the urging force of the spring 30$s$, so that an output of the simultaneous engagement signal pressure $P_{FSV}$ does not occur.

With the forward second gear in the D-range, in a state in which the first and second solenoid valves S1, S2 are turned OFF respectively, and outputs of the signal pressures $P_{S1}$, $P_{S2}$ from both the output ports S1$b$, S2$b$ are not produced, the parking switch valve 32 is locked at the right half position as described above, so that the parking release state is assumed. In the same manner, the third solenoid valve S3 is turned OFF, and the fourth solenoid valve S4 is turned ON, so that the original pressure switch valve 37 and the fail-safe switch valve 35 take the left half positions and an output of the line pressure $P_L$ to all the linear solenoid valves SL1 to SL5 is produced.

Here, since the linear solenoid valves SL1, SL5 are turned ON, in the linear solenoid valve SL1, the engagement pressure $P_{SL1}$ is supplied from the output port SL1b to the hydraulic servo 51 to engage the first clutch C-1, and in the linear solenoid valve SL5, the engagement pressure $P_{SL5}$ is supplied from the output port SL5b to the hydraulic servo 61 to lock the first brake B-1, whereby the forward second gear is assumed. In this state, in the fail-safe valve 30, the oil chamber 30a receives an input of the engagement pressure $P_{SL1}$ and the oil chamber 30e receives an input of the engagement pressure $P_{SL5}$. However, the left half position is maintained by the line pressure $P_L$ acting on the hydraulic oil chamber 30i and the urging force of the spring 30s, so that an output of the simultaneous engagement signal pressure $P_{FSV}$ does not occur.

With the forward third gear in the D-range, in the same manner as described above, the parking switch valve 32 is locked at the right half position in the state in which the first and second solenoid valves S1, S2 are turned OFF, so that the parking release state is assumed. In addition, the third solenoid valve S3 is turned OFF, and the fourth solenoid valve S4 is turned ON, so that an output of the line pressure $P_L$ to all the linear solenoid valves SL1 to SL5 is produced.

Here, since the linear solenoid valves SL1, SL3 are turned ON, in the linear solenoid valve SL1, the engagement pressure $P_{SL1}$ is supplied from the output port SL1b to the hydraulic servo 51 to engage the first clutch C-1, and in the linear solenoid valve SL3, the engagement pressure $P_{SL3}$ is supplied from the output port SL3b to the hydraulic servo 53 to engage the third clutch C-3, whereby the forward third gear is assumed. In this state, in the fail-safe valve 30, the oil chamber 30a receives an input of the engagement pressure $P_{SL1}$ and the oil chamber 30c receives an input of the engagement pressure $P_{SL3}$. However, the left half position is maintained by the line pressure $P_L$ acting on the hydraulic oil chamber 30i and the urging force of the spring 30s, so that an output of the simultaneous engagement signal pressure $P_{FSV}$ does not occur.

With the forward fourth gear in the D-range, in the same manner as described above, the parking switch valve 32 is locked at the right half position in the state in which the first and second solenoid valves S1, S2 are turned OFF, so that the parking release state is assumed. In addition, the third solenoid valve S3 is turned OFF, and the fourth solenoid valve S4 is turned ON, so that an output of the line pressure $P_L$ to all the linear solenoid valves SL1 to SL5 is produced.

Here, since the linear solenoid valves SL1, SL4 are turned ON, in the linear solenoid valve SL1, the engagement pressure $P_{SL1}$ is supplied from the output port SL1b to the hydraulic servo 51 to engage the first clutch C-1, and in the linear solenoid valve SL4, the engagement pressure $P_{SL4}$ is supplied from the output port SL4b to the hydraulic servo 54 to engage the fourth clutch C-4, whereby the forward fourth gear is assumed. In this state, in the fail-safe valve 30, the oil chamber 30a receives an input of the engagement pressure $P_{SL1}$ and the oil chamber 30d receives an input of the engagement pressure $P_{SL4}$. However, the left half position is maintained by the line pressure $P_L$ acting on the hydraulic oil chamber 30i and the urging force of the spring 30s, so that an output of the simultaneous engagement signal pressure $P_{FSV}$ does not occur.

With the forward fifth gear in the D-range, in the same manner as described above, the parking switch valve 32 is locked at the right half position in the state in which the first and second solenoid valves S1, S2 are turned OFF, so that the parking release state is assumed. In addition, the third solenoid valve S3 is turned OFF, and the fourth solenoid valve S4 is turned ON, so that an output of the line pressure $P_L$ to all the linear solenoid valves SL1 to SL5 is produced.

Here, since the linear solenoid valves SL1, SL2 are turned ON, in the linear solenoid valve SL1, the engagement pressure $P_{SL1}$ is supplied from the output port SL1b to the hydraulic servo 51 to engage the first clutch C-1. In the linear solenoid valve SL2, an output of the engagement pressure $P_{SL2}$ from the output port SL2b to the input port 36b of the distribution switch valve 36 is produced. However, the distribution switch valve 36 at this time is switched to the right half position because the oil chamber 36i receives an input of the parking release pressure via the check ball valve 38, and also is locked to the right half position by a lock pressure (line pressure $P_L$) input to the hydraulic oil chamber 36c. Therefore, the engagement pressure $P_{SL2}$ is supplied from the input port 36b to the hydraulic servo 52 via the output port 36h to engage the second clutch C-2. Accordingly, the forward fifth gear is assumed in cooperation with the engagement of the first clutch C-1. In this state, in the fail-safe valve 30, the oil chamber 30a receives an input of the engagement pressure $P_{SL1}$ and the oil chamber 30b receives an input of the engagement pressure $P_{SL2}$. However, the left half position is maintained by the line pressure $P_L$ acting on the hydraulic oil chamber 30i and the urging force of the spring 30s, so that an output of the simultaneous engagement signal pressure $P_{FSV}$ does not occur.

With the forward sixth gear in the D-range, in the same manner as described above, the parking switch valve 32 is locked at the right half position in the state in which the first and second solenoid valves S1, S2 are turned OFF, so that the parking release state is assumed. In addition, the third solenoid valve S3 is turned OFF, and the fourth solenoid valve S4 is turned ON, so that an output of the line pressure $P_L$ to all the linear solenoid valves SL1 to SL5 is produced.

Here, since the linear solenoid valves SL2, SL4 are turned ON, in the linear solenoid valve SL4, the engagement pressure $P_{SL4}$ is supplied from the output port SL4b to the hydraulic servo 54 to engage the fourth clutch C-4. In the linear solenoid valve SL2, an output of the engagement pressure $P_{SL2}$ from the output port SL2b to the input port 36b of the distribution switch valve 36 is produced. However, the distribution switch valve 36 is locked to the right half position as in the case of the forward fifth gear described above. Therefore, the engagement pressure $P_{SL2}$ is supplied from the input port 36b to the hydraulic servo 52 via the output port 36h to engage the second clutch C-2. Accordingly, the forward sixth gear is assumed in cooperation with the engagement of the fourth clutch C-4. In this state, in the fail-safe valve 30, the oil chamber 30b receives an input of the engagement pressure $P_{SL2}$ and the oil chamber 30d receives an input of the engagement pressure $P_{SL4}$. However, the left half position is maintained by the line pressure $P_L$ acting on the hydraulic oil chamber 30i and the urging force of the spring 30s, so that an output of the simultaneous engagement signal pressure $P_{FSV}$ does not occur.

With the forward seventh gear in the D-range, in the same manner as described above, the parking switch valve 32 is locked at the right half position in the state in which the first and second solenoid valves S1, S2 are turned OFF, so that the parking release state is assumed. In addition, the third solenoid valve S3 is turned OFF, and the fourth solenoid valve S4 is turned ON, so that an output of the line pressure $P_L$ to all the linear solenoid valves SL1 to SL5 is produced.

Here, since the linear solenoid valves SL2, SL3 are turned ON, in the linear solenoid valve SL3, the engagement pressure $P_{SL3}$ is supplied from the output port SL3b to the hydraulic servo 53 to engage the third clutch C-3. In the linear solenoid valve SL2, an output of the engagement pressure $P_{SL2}$ from the output port SL2b to the input port 36b of the distribution switch valve 36 is produced. However, the distribution switch valve 36 is locked to the right half position as in the case of the forward fifth and sixth gears. Therefore, the engagement pressure $P_{SL2}$ is supplied from the input port 36b to the hydraulic servo 52 via the output port 36h to engage the second clutch C-2. Therefore, the forward seventh gear is assumed in cooperation with the engagement of the third clutch C-3. In this state, in the fail-safe valve 30, the oil chamber 30b receives an input of the engagement pressure $P_{SL2}$ and the oil chamber 30c receives an input of the engagement pressure $P_{SL3}$. However, the left half position is maintained by the line pressure $P_L$ acting on the hydraulic oil chamber 30i and the urging force of the spring 30s, so that an output of the simultaneous engagement signal pressure $P_{FSV}$ does not occur.

With the forward eighth gear in the D-range, in the same manner as described above, the parking switch valve 32 is locked at the right half position in the state in which the first and second solenoid valves S1, S2 are turned OFF, so that the parking release state is assumed. In addition, the third solenoid valve S3 is turned OFF, and the fourth solenoid valve S4 is turned ON, so that an output of the line pressure $P_L$ to all the linear solenoid valves SL1 to SL5 is produced.

Here, since the linear solenoid valves SL2, SL5 are turned ON, in the linear solenoid valve SL5, the engagement pressure $P_{SL5}$ is supplied to the hydraulic servo 61 from the output port SL5b to lock the first brake B-1. In the linear solenoid valve SL2, an output of the engagement pressure $P_{SL2}$ from the output port SL2b to the input port 36b of the distribution switch valve 36 is produced. However, the distribution switch valve 36 is locked to the right half position as in the case of the forward fifth to seventh gears described above. Therefore, the engagement pressure $P_{SL2}$ is supplied from the input port 36b to the hydraulic servo 52 via the output port 36h to engage the second clutch C-2. Therefore, the forward eighth gear is assumed in cooperation with the locking of the first brake B-1. In this state, in the fail-safe valve 30, the oil chamber 30b receives an input of the engagement pressure $P_{SL2}$ and the oil chamber 30e receives an input of the engagement pressure $P_{SL5}$. However, the left half position is maintained by the line pressure $P_L$ acting on the hydraulic oil chamber 30i and the urging force of the spring 30s, so that an output of the simultaneous engagement signal pressure $P_{FSV}$ does not occur.

[Action When Solenoid Valve All-Off Fail Occurs]

Subsequently, at the time of solenoid-all-off fail in the first computer and the first command system thereof will be described. When failures such as the powering down of the first computer, the disconnection in the first command system, coming apart of the connector, in the first command system are detected, for example, the hydraulic control apparatus 20 of an automatic transmission goes to a solenoid-all-off fail mode in which the solenoid valves S1, S2, S4 and the linear solenoid valves SL1 to SL5 controlled by the first computer and the first command system thereof are turned OFF. As a method of detecting the failures, for example, a case where the control instructed by the first computer and the actual action of the automatic transmission 1 are different (for example, a case where the instructed transmission gear speed is different from the actual gear ratio) is considered. Also, occurrence of the solenoid-all-off fail in the first computer and the first command system thereof is transmitted to the second computer or detected by the second computer. However, the description is given assuming that the third solenoid valve S3 is still in the OFF state at a time point when the solenoid-all-off fail occurs.

For example, if the solenoid-all-off fail occurs in the first computer and the first command system thereof while the vehicle travels in the forward range, the solenoid valves S1, S2, S4 and the linear solenoid valves SL1 to SL5 are turned OFF. Then, a state in which an output of the signal pressure $P_{S4}$ is produced only from the fourth solenoid valve S4 of the normally-open type is assumed, and other solenoid valves stop output of the signal pressure or the engagement pressure. Therefore, specifically in the linear solenoid valves SL2, SL3, the output ports SL2b, SL3b, and the exhaust ports SL2c, SL3c are brought into a communicating state.

In this case, in the fail-safe switch valve 35, the hydraulic oil chamber 35a receives an input of the signal pressure $P_{S4}$ of the fourth solenoid valve S4, which overcomes the urging force of the spring 35s, so that the spool 35p is switched to the right half position. Therefore, the line pressure $P_L$ input to the input port 35c is output from the output port 35i to the oil channel f and is input to the input port 36d of the distribution switch valve 36. In this case, since the distribution switch valve 36 is locked at the right half position by the line pressure $P_L$ input to the hydraulic oil chamber 36c on the basis of the difference in areas presented to the pressure between the large-diameter land portion and the small-diameter land portion as described above, the input port 35j of the fail-safe switch valve 35 receives an input of the line pressure $P_L$ input to the input port 36d from the output port 36e via the oil channel f1, and then the exhaust ports SL2c, SL3C of the linear solenoid valves SL2, SL3 receives an input of the same via the output port 35e and the oil channels f2, f3, f4 as the reverse input pressure.

Accordingly, the linear solenoid valve SL2 which receives an input of the reverse input pressure from the exhaust port SL2c produces an output of the reverse input pressure (that is, the line pressure $P_L$) from the output port SL2b to the oil channels g, g1 as the engagement pressure $P_{SL2}$, and supplies the same to the hydraulic servo 52 via the input port 36b and then the output port 36h of the distribution switch valve 36 and the oil channel g4, whereby engagement of the second clutch C-2 is assumed. Simultaneously, the linear solenoid valve SL3 which receives an input of the reverse input pressure from the exhaust port SL3c supplies the same from the output port SL3b to the hydraulic servo 53 via the oil channels h, h1 as the engagement pressure $P_{SL3}$, whereby the engagement of the third clutch C-3 is assumed. Therefore, the forward seventh gear is assumed in cooperation with the engagement of the second clutch C-2, and so-called, limp home is assumed.

As described above, when the solenoid-all-off fail in the first command system occurs while the vehicle travels in a, described later, forward travel range, the forward seventh gear in which the second clutch C-2 and the third clutch C-3 are engaged is assumed.

However, when the solenoid-all-off fail in the first command system occurs during the travel applied with the engine brake with the forward first gear, since the first solenoid valve S1 has been turned ON before the occurrence of the solenoid-all-off fail in the first command system, the first hydraulic oil chamber 36a of the distribution switch valve 36 has already received an input of the signal pressure $P_{S1}$. Therefore, the first spool 36p and the second spool 36q have taken the left half positions already and hence the line pressure $P_L$ is blocked even when the line pressure $P_L$ from the output port 35*i* acts on the input port 36*d* on the basis of the turning OFF of the fourth solenoid valve S4 at the time of the solenoid-all-off fail in the first command system, whereby the reverse inputs to the linear solenoid valves SL2, SL3 do not occur and the N-range is assumed.

In contrast, for example, when the vehicle is in the P-range and the solenoid-all-off fail in the first command system occurs, a state in which only the fourth solenoid valve S4 of the normally-open type outputs the signal pressure $P_{S4}$ results, and a state in which the line pressure $P_L$ acts on the input port 36*d* of the distribution switch valve 36 via the input port 35*c* and the output port 35*i* of the fail-safe switch valve 35 results. However, since in this case, in the P-range, the first spool 36*p* and the second spool 36*q* of the distribution switch valve 36 have taken the left half positions before occurrence of the solenoid-all-off fail in the first command system on the basis of the urging force of the spring 36*s*, the line pressure $P_L$ acting on the input port 36*d* is blocked and does not act on the input port 35*j* of the fail-safe switch valve 35. Therefore, inputs of the reverse input pressures to the exhaust ports SL2*c*, SL3*c* of the linear solenoid valves SL2, SL3 are avoided. Since the parking switch valve 32 has taken the left half position already at the time of occurrence of the solenoid-all-off fail and hence the line pressure $P_L$ to the parking cylinder 33 is blocked, the parking state is maintained.

In this manner, at the time of occurrence of the solenoid-all-off fail in the first command system when the vehicle is in the P-range, engagement and locking of any of the first to fourth clutches C-1 to C-4 and the first and second brakes B-1, B-2 do not occur, whereby the P-range is maintained.

For example, if the solenoid-all-off fail in the first command system occurs when the vehicle is in the R-range, the state in which only the fourth solenoid valve S4 outputs the signal pressure $P_{S4}$ is assumed in the same manner, so that a state in which the line pressure $P_L$ acts on the input port 36*d* of the distribution switch valve 36 is assumed. However, in this case, in the R-range as well, the second hydraulic oil chamber 36*i* has received an input of the parking release pressure, but the first hydraulic oil chamber 36*a* has received an input of the signal pressure $P_{S1}$ of the first solenoid valve S1 in the distribution switch valve 36, and the first spool 36*p* and the second spool 36*q* of the distribution switch valve 36 have taken the left half positions before occurrence of the solenoid-all-off fail in the first command system on the basis of the urging force of the spring 36*s*, the line pressure $P_L$ acting on the input port 36*d* is blocked. Therefore, inputs of the reverse input pressures to the exhaust ports SL2*c*, SL3*c* of the linear solenoid valves SL2, SL3 are avoided. Also the spool 32*p* of the parking switch valve 32 which has been locked on the right half position before occurrence of solenoid-all-off fail in the first command system remains at the right half position since the line pressure $P_L$ continuously acts on the input port 32*b*, and hence the parking released state is maintained.

In this manner, at the time of occurrence of the solenoid-all-off fail in the first command system when the vehicle travels in the R-range, engagement and locking of any of the first to fourth clutches C-1 to C-4 and the first and second brakes B-1, B-2 do not occur, whereby transition to the N-range results.

Then, when the solenoid-all-off fail in the first command system occurs when the vehicle is in the N-range, the state in which only the fourth solenoid valve S4 outputs the signal pressure $P_{S4}$ is assumed in the same manner, so that the state in which the line pressure $P_L$ acts on the input port 36*d* of the distribution switch valve 36 is assumed. However, at this time, since the distribution switch valve 36 has taken the left half position in the same manner as in the case of the R-range before the occurrence of the solenoid-all-off fail in the first command system in the N-range, the line pressure $P_L$ acting on the input port 36*d* is blocked. Therefore, inputs of the reverse input pressures to the exhaust ports SL2*c*, SL3*c* of the linear solenoid valves SL2, SL3 do not occur, the spool 32*p* of the parking switch valve 32 which has been locked on the right half position before occurrence of solenoid-all-off fail in the first command system remains at the right half position since the line pressure $P_L$ continuously acts on the input port 32*b*, and hence the parking released state is maintained.

In this manner, at the time of occurrence of the solenoid-all-off fail in the first command system when the vehicle is in the N-range, engagement and locking of any of the first to fourth clutches C-1 to C-4 and the first and second brakes B-1, B-2 do not occur, whereby the N-range is maintained.

As described thus far, even when the solenoid-all-off fail in the first command system occurs in any one of the forward first gear to the forward eighth gear except for the engine brake with the forward first gear, the forward seventh gear is established to ensure the traveling of the vehicle, and in a case where the solenoid-all-off fail in the first command system occurs when the vehicle is in the P-range, R-range, or N-range, or at the time of the engine brake with the forward first gear, the forward seventh gear is not established, and the stability in travel of the vehicle is secured by maintaining the P-range when the vehicle is in the P-range, shifting to the N-range when in the R-range, maintaining the N-range when in the N-range, and shifting to the N range at the time of the engine brake with the forward first gear.

[Switch to Limp Home by Second Computer]

Subsequently, a limp home switch function by the second computer and the second command system thereof after the occurrence of the solenoid-all-off fail of the first command system will be described.

As described above, in the case where the solenoid-all-off fail in the first command system occurs while the vehicle is traveling in the forward range (except for the engine brake with the forward first gear), the distribution switch valve 36 takes the right half position, and the exhaust ports SL2*c*, SL3*c* of the linear solenoid valves SL2, SL3 receive inputs of the reverse input pressures via the oil channels f, f1, f2, f3, f4, that is, a limp home state achieving the forward seventh gear is assumed.

In this state, for example, when the driver operates the shift lever to any one of the N-range, the R-range, and the P-range, the second computer turns ON the third solenoid valve S3 in response thereto, and the third solenoid valve S3 outputs the signal pressure $P_{S3}$. Then, the hydraulic oil chamber 37*a* of the original pressure switch valve 37 receives an input of the signal pressure $P_{S3}$ via the check ball valve 38, the spool 37*p* is switched to the right half position against the urging force of the spring 37*s*, communication between the input port 37*b* and the output port 37*c* is blocked, that is, the line pressure $P_L$ supplied to the oil channel a6 is blocked, so that the supply of the line pressure $P_L$ to the oil channel a8 is stopped. Therefore, the supply of the line pressure $P_L$ to the input port 35*c* of the fail-safe switch valve 35 is no longer continued, that is, the original pressure of the reverse input pressure is blocked, and hence the reverse input to the exhaust ports SL2*c*, SL3*c* of the linear solenoid valves SL2, SL3 via the oil channels f, f1, f2, f3, f4 is no longer continued, whereby the neutral state (limp home stop state) is achieved.

For example, when the driver operates the shift lever from the neutral state to the D-range, the second computer turns OFF the third solenoid valve S3 in response thereto, and the third solenoid valve S3 brings the signal pressure $P_{S3}$ to the non-output state. Then, the signal pressure $P_{S3}$ of the hydraulic oil chamber 37a does not act any longer in the original pressure switch valve 37, the spool 37p is switched to the left half position by the urging force of the spring 37s, the input port 37b and the output port 37c are brought into communication, that is, the line pressure $P_L$ is supplied to the oil channel a8 again. Accordingly, the line pressure $P_L$ is supplied again to the input port 35c of the fail-safe switch valve 35, and the exhaust ports SL2c, SL3c of the linear solenoid valves SL2, SL3 receive reverse inputs of the reverse input pressure via the oil channels f, f1, f2, f3, f4, so that the forward seventh gear (that is, a limp home traveling state), which is the same as the case of occurrence of the solenoid-all-off fail in the first command system during the travel in the forward range is achieved.

In contrast, in the case where the solenoid-all-off fail in the first command system occurs while the vehicle is in the R-range, the N-range, or at the engine brake with the forward first gear, the distribution switch valve 36 is at the left half position, the reverse input pressure is blocked between the oil channels f, f1, whereby the reverse input pressure is not supplied to the exhaust ports SL2c, SL3c of the linear solenoid valves SL2, SL3, and the neutral state (that is, the limp home stop state) is achieved.

In this state, for example, when the driver operates the shift lever to the D-range, the second computer turns ON the third solenoid valve S3 once in response thereto, and the third solenoid valve S3 outputs the signal pressure $P_{S3}$. Accordingly, the second hydraulic oil chamber 36i of the distribution switch valve 36 receives an input of the signal pressure $P_{S3}$ via the oil channels d, d1, the check ball valve 38, and the oil channel 1. Accordingly, the spool 36p of the distribution switch valve 36 is switched to the right half position and, further, the hydraulic oil chamber 36c receives an input of the line pressure $P_L$ via the oil channel a17, and the spool 36p is locked to the right half position.

Subsequently, the second computer turns OFF the third solenoid valve S3, and the third solenoid valve S3 brings the signal pressure $P_{S3}$ to the non-output state. Then, in the same manner as described above, the signal pressure $P_{S3}$ of the hydraulic oil chamber 37a does not act any longer in the original pressure switch valve 37, the spool 37p is switched to the left half position by the urging force of the spring 37s, the input port 37b and the output port 37c are brought into communication, that is, the line pressure $P_L$ is supplied to the oil channel a8 again. Accordingly, the line pressure $P_L$ is supplied again to the input port 35c of the fail-safe switch valve 35, and the reverse input pressure is reversely input to the exhaust ports SL2c, SL3c of the linear solenoid valves SL2, SL3 via the oil channels f, f1, f2, f3, f4, so that the forward seventh gear (that is, the limp home traveling state), which is the same as the case of occurrence of the solenoid-all-off fail in the first command system during the travel in the forward range is achieved.

Also, from this state, for example, when the driver operates the shift lever to any one of the N-range, the R-range, and the P-range, the second computer turns ON the third solenoid valve S3 in response thereto, and the third solenoid valve S3 outputs the signal pressure $P_{S3}$. Then, in the same manner as described above, the hydraulic oil chamber 37a of the original pressure switch valve 37 receives an input of the signal pressure $P_{S3}$, the spool 37p is switched to the right half position against the urging force of the spring 37s, the communication between the input port 37b and the output port 37c is blocked, that is, the line pressure $P_L$ supplied to the oil channel 96 is blocked, so that the supply of the line pressure $P_L$ to the oil channel a8 is stopped. Therefore, the supply of the line pressure $P_L$ to the input port 35c of the fail-safe switch valve 35 is no longer continued, that is, the original pressure of the reverse input pressure is blocked, and hence the reverse input to the exhaust ports SL2c, SL3c of the linear solenoid valves SL2, SL3 via the oil channels f, f1, f2, f3, f4 is no longer continued, whereby the neutral state (that is, the limp home stop state) is achieved.

Therefore, even when the solenoid-all-off fail in the first command system occurs in the D-range, and even when the solenoid-all-off fail in the first command system occurs in the R-range and the N-range, if the D-range is assumed, the forward seventh gear is established, and when the P-range, the R-range, and the N-range are assumed, the neutral state is achieved by the second computer and the second command system. In other words, even after the occurrence of the solenoid-all-off fail in the first command system, the limp home function with which switching of the state between the travel and non-travel by the second computer or the second command system is performed is satisfactorily equipped.

The parking switch valve 32 after the occurrence of the solenoid-all-off fail in the first command system is locked at the right half position as long as an input of the line pressure $P_L$ from the input port 32b acts as described above, and is locked in the parking release state. The second solenoid valve S2 is not turned ON in association with the solenoid-all-off fail in the first command system. However, when the engine is stopped once and the line pressure $P_L$ is not generated any longer, the lock in the parking switch valve 32 is released, and hence the hydraulic pressure is not applied on the parking cylinder 33, and the parking state is assumed. Also, after having stopped the engine once, the line pressure $P_L$ with respect to the hydraulic oil chamber 36c of the distribution switch valve 36 is disconnected once, and hence the lock of the distribution switch valve 36 is released, so that the left half position is assumed. Then, after having stopped the engine once, the third solenoid valve S3 is not turned ON by the second command system any longer, so that a state in which the reverse input pressure (between the oil channels f, f1) is blocked by the distribution switch valve 36 is maintained, and hence the forward seventh gear is not established, and the parking state is maintained.

[Fail-Safe Control at the Time of Simultaneous Engagement of Three Elements]

Referring now to FIG. 3 and FIG. 6, the fail-safe control at the time of simultaneous engagement of three frictional engagement elements as the principal portion of the present invention will be described along an example shown in FIG. 7.

As shown in FIG. 7, for example, in a state in which the engagement pressures $P_{SL1}$, $P_{SL3}$ are supplied from the linear solenoid valves SL1, SL3 to the hydraulic servos 51, 53 with the forward third gear, the oil chamber 30a receives an input of the engagement pressure $P_{SL1}$ and the oil chamber 30c receives an input of the engagement pressure $P_{SL3}$ respectively in the fail-safe valve 30 is assumed as shown in FIG. 3 and FIG. 6. However, the urging force of the spring 30s and the action of the line pressure $P_L$ to the hydraulic oil chamber 30i are not defeated by the engagement pressures $P_{SL1}$, $P_{SL3}$, and hence the left half position is maintained.

From this state, if the linear solenoid valve SL4 generates an on-fail (failure to output the engagement pressure $P_{SL4}$) for example, at a time point t1 in FIG. 7, the engagement pressure $P_{SL4}$ from the linear solenoid valve SL4 starts rising. Then, when the engagement pressure $P_{SL4}$ reaches a predetermined pressure (predetermined hydraulic command value) Px at a time point t2, in the fail-safe valve 30 shown in FIG. 3 and FIG. 6, the engagement pressure $P_{SL4}$ of the predetermined pressure Px acts on the oil chamber 30d, and the action of the line pressure $P_L$ of the hydraulic oil chamber 30i and the urging force of the spring 30s are defeated by the engagement pressure $P_{SL1}$ to the oil chamber 30a in cooperation with the engagement pressure $P_{SL3}$ to the oil chamber 30c, and hence the first spool 30p and the second spool 30q are switched to the right half positions. Then, the line pressure $P_L$ having been input to the input port 30h is output to the oil channel n from the output port 30g as the simultaneous engagement signal pressure $P_{FSV}$ which indicates the simultaneous engagement of the three elements. At this time, since the lock oil chamber 30f receives an input of the simultaneous engagement signal pressure $P_{FSV}$ via the oil channel n1, the second spool 30q is locked to the right half position.

When an output of the simultaneous engagement signal pressure $P_{FSV}$ from the fail safe valve 30 is produced, as shown in FIG. 3, the simultaneous engagement signal pressure $P_{FSV}$ is input to the input port 38d of the check ball valve 38 via the oil channel n2, is output to the oil channel o from an output port 38e by rolling the check ball 38h, and is input to the hydraulic oil chamber 37a of the original pressure switch valve 37 described above. Then, in the original pressure switch valve 37, the spool 37p is switched to the right half position against the urging force of the spring 37s, the communication between the input port 37b and the output port 37c is blocked, that is, the line pressure $P_L$ supplied to the oil channel a6 is blocked, so that the supply of the line pressure $P_L$ to the oil channel a8 is stopped. Therefore, the supply of the line pressure $P_L$ to the input port 35c of the fail-safe switch valve 35 is no longer continued, that is, the line pressure $P_L$ from the output port 35d to the oil channels a9 to a14 is blocked, so that the original pressures of the linear solenoid valves SL1 to SL5 are all blocked, so that the neutral state is achieved. Accordingly, the simultaneous engagement of three clutches of the clutch C-1, the clutch C-3, the clutch C-4 is prevented, and the automatic transmission 1 is prevented from becoming the stall state.

When the neutral state is assumed, the oil chambers 30a, 30c, 30d of the fail-safe valve 30 do not receive inputs of the engagement pressures $P_{SL1}$, $P_{SL3}$, $P_{SL4}$ any longer. However, since the second spool 30q is locked at the right half position by the simultaneous engagement signal pressure $P_{FSV}$ to the lock oil chamber 30f, an output of the simultaneous engagement signal pressure $P_{FSV}$ is produced continuously, so that hunching, which is a repetition of the output and the non-output of the simultaneous engagement signal pressure $P_{FSV}$, is prevented.

Subsequently, at a time point t3 in FIG. 7, the fourth solenoid valve S4 is turned OFF by the control of the first computer, and the hydraulic oil chamber 35a of the fail-safe switch valve 35 receives an input of the signal pressure $P_{S4}$, so that the fail-safe switch valve 35 is switched to the right half position. Then, the line pressure $P_L$ having been input to the input port 35f via the oil channel a1b is blocked, and the supply of the line pressure $P_L$ to the output port 35g and the oil channel a19 is no longer continued, and hence the lock of the second spool 30q of the fail-safe valve 30 at the right half position is released and the original pressure of the simultaneous engagement signal pressure $P_{FSV}$ is blocked, so that the output of the simultaneous engagement signal pressure $P_{FSV}$ is not produced any longer. Therefore, in the original pressure switch valve 37, the spool 37p is switched to the left half position by the urging force of the spring 37s, and the supply of the line pressure $P_L$ to the oil channel a8 is restarted. Accordingly, a similar state to the limp home state described above is assumed, and the line pressure $P_L$ is supplied again to the input port 35c of the fail-safe switch valve 35, and the reverse input pressure is reversely input to the exhaust ports SL2c, SL3c of the linear solenoid valves SL2, SL3 via the oil channels f, f1, f2, f3, f4, so that the forward seventh gear (that is, the limp home traveling state) is achieved.

Thereafter, the switch of the limp home, that is, the switch between the traveling state with the forward seventh gear and the neutral state is achieved in the same manner as described above by controlling the third solenoid valve S3 between ON and OFF by the second computer.

In the fail-safe control as described above, the case in which the on-fail occurs in the linear solenoid valve SL4 with the forward third gear has been described as an example. However, the invention is not limited thereto, and with any transmission gear speed, when the fail-safe valve 30 receives inputs of the three or more engagement pressures by the unnecessary on-fail of the linear solenoid valve, an output of the simultaneous engagement signal pressure $P_{FSV}$ is produced in the same manner, and the stall sate of the automatic transmission 1 is prevented. Also, the establishment of the forward seventh gear as the limp home thereafter may be achieved from any transmission gear speeds.

As described above, according to the hydraulic control apparatus 20 in the present invention, an output of the simultaneous engagement signal pressure $P_{FSV}$ is produced when the fail-safe valve 30 receives inputs of a predetermined number (two) or more engagement pressures $P_{SL1}$ to $P_{SL5}$, and the original pressure (line pressure $P_L$) to the linear solenoid valves SL1 to SL5 is blocked when the original pressure switch valve 37 receives an input of the simultaneous engagement signal pressure $P_{FSV}$ from the fail-safe valve 30. Therefore, the simultaneous engagement of the predetermined number (three) or more of clutches or brakes is prevented without the necessity of a number of fail-safe valves or a number of oil channels, and the downsizing of the hydraulic control apparatus 20 is achieved, so that the vehicle-mountability is improved. Also, since the necessity of the passage of the engagement pressures $P_{SL1}$ to $P_{SL5}$ through the fail-safe valve when supplying the same to the hydraulic servo can be eliminated, hydraulic responsiveness to the clutches or the brakes is improved, and hence improvement of transmission response and reduction of an engagement shock are also achieved. Since what is essential for the fail-safe valve 30 is only to receive inputs of the respective engagement pressures $P_{SL1}$ to $P_{SL5}$ as a signal without causing the same to pass therethrough, the diameter of the valve by itself may be reduced in comparison with, for example, a valve being interposed between the channels for supplying the engagement pressures $P_{SL1}$ to $P_{SL5}$ to the hydraulic servo and configured to allow the engagement pressures $P_{SL1}$ to $P_{SL5}$ to pass therethrough.

Also, since the fail-safe valve 30 includes the first spool 30p, the plurality of oil chambers 30a to 30e configured to receive inputs of the respective engagement pressures $P_{SL1}$ to $P_{SL5}$ to cause the same to act on the first spool 30p, the hydraulic oil chamber 30i configured to receive an input of the line pressure $P_L$ and to do a counter action against two of the engagement pressures $P_{SL1}$ to $P_{SL5}$ acting on the first and second spools 30p, 30q, and the spring 30s generating an urging force which is defeated by the third engagement pressures $P_{SL1}$ to $P_{SL5}$ acting on the first spool 30p, a configuration in which the position is switched to the right half position (output position) where an output of the simultaneous engagement signal pressure $P_{FSV}$ is produced when the plurality of oil chambers 30a to 30e receive inputs of the three or more of the engagement pressures $P_{SL1}$ to $P_{SL5}$ is achieved.

In addition, since the fail-safe valve 30 is configured to lock the second spool 30q at the right half position (output position) even when the original pressure switch valve 37 blocks the original pressure (line pressure $P_L$) to the linear solenoid valves SL1 to SL5 by the output of the simultaneous engagement signal pressure $P_{FSV}$, occurrence of the hunching such that inputs of the predetermined number (three) or more of the engagement pressures $P_{SL1}$ to $P_{SL5}$ from the linear solenoid valves SL1 to SL5 are no longer supplied and hence the second spool 30q returns back to the left half position (non-output position) is prevented.

Also, since the fail-safe switch valve 35 is configured to block the original pressure (line pressure $P_L$) of the simultaneous engagement signal pressure $P_{FSV}$ of the fail-safe valve 30 and produce an output of the original pressure (line pressure $P_L$) from the original pressure switch valve 37 to the exhaust ports SL2c, SL3c of the linear solenoid valves SL2, SL3 as the reverse input pressure for causing the same to be reversely input thereto upon receipt of an input of the signal pressure $P_{S4}$ from the fourth solenoid valve S4, a shift from a state in which the original pressure to the linear solenoid valves SL1 to SL5 is blocked (that is, the neutrals state) to the traveling state in which the forward seventh gear is established by engaging the clutches C-2, C-3 (that is, the limp home) is achieved by controlling the fourth solenoid valve S4 between ON and OFF.

Then, since the third solenoid valve S3 which is able to produce an output of the signal pressure $P_{S3}$ for switching the original pressure switch valve 37, and the check ball valve 38 configured to output a larger one of the signal pressure $P_{S3}$ and the simultaneous engagement signal pressure $P_{FSV}$ to the original pressure switch valve 37 are provided, while switching of the original pressure switch valve 37 can be performed by the control of the third solenoid valve S3 in the normal state, the original pressure switch valve 37 can be switched by the simultaneous engagement signal pressure $P_{FSV}$ when the fail-safe valve 30 outputs the simultaneous engagement signal pressure $P_{FSV}$.

In the embodiment described thus far, the case where the hydraulic control apparatus 20 is applied to the multispeed automatic transmission 1 in which the eight gear speeds for forward traveling and one gear speed for reverse traveling are enabled has been described as an example, the invention is not limited thereto as a matter of course and, in particular, the invention may be applied to any transmission with steps which establishes the respective transmission gear speeds by the engagement of the predetermined number of the frictional engagement elements. More specifically, in the case of the automatic transmission configured to establish the transmission gear speeds by engaging the three engagement elements, by designing the fail-safe valve so that the total area presented to the pressure of the three oil chambers which receive the three engagement pressures and the area of the hydraulic oil chamber which receives the line pressure are balanced, and the spring is defeated by the fourth engagement pressure, the invention in the present application can be applied in the same manner.

In this embodiment, the automatic transmission having the four clutches and the two brakes has been described as an example. However in a case of the automatic transmission having the three clutches and the two brakes for example, the present invention can be applied in the same manner only by reducing the oil chamber which receives the engagement pressure in the fail-safe valve by one.

The hydraulic control apparatus of the automatic transmission according to the present invention can be used in automatic transmissions which is mounted on passenger cars, auto trucks, buses, agricultural vehicles, and the like and, specifically, is suitable to be used in multispeed automatic transmissions which engages a predetermined number of frictional engagement elements at the respective transmission gear speeds, and which requires prevention of the simultaneous engagement of the predetermined number or more of the frictional engagement elements.

What is claimed is:

1. A hydraulic control apparatus of an automatic transmission having a plurality of engagement pressure solenoid valves configured to regulate an engagement pressure supplied to a hydraulic servo of a frictional engagement element and being configured to output the engagement pressures from a predetermined number of the engagement pressure solenoid valves from among the plurality of engagement pressure solenoid valves to establish respective transmission gear speeds by engagement of the predetermined number of the frictional engagement elements, the hydraulic control apparatus comprising:

a simultaneous engagement signal switch valve configured to be switched from a non-output position where an output of a simultaneous engagement signal pressure is not produced to an output position where an output of the simultaneous engagement signal pressure is produced upon receipt of an input of the engagement pressures by a number larger than the predetermined number; and an original pressure switch valve configured to be switched from a supply position where an original pressure is supplied to the plurality of engagement pressure solenoid valves to a blocked position where the original pressure is blocked upon receipt of an input of the simultaneous engagement signal pressure from the simultaneous engagement signal switch valve.

2. The hydraulic control apparatus of an automatic transmission according to claim 1, wherein the automatic transmission establishes the respective transmission gear speeds by an engagement of a predetermined two frictional engagement elements, and the simultaneous engagement signal switch valve includes a spool, a plurality of oil chambers configured to receive inputs of the respective engagement pressures to cause the same to act on the spool, an opposed oil chamber to do a counter action against two of the engagement pressures which act on the spool by receiving an input of the original pressure, and an urging member providing an urging force which is defeated by a third engagement pressure acting on the spool, and is switched to the output position where an output of the simultaneous engagement signal pressure is produced when the plurality of oil chambers receive inputs of the three or more engagement pressures.

3. The hydraulic control apparatus of an automatic transmission according to claim 2, wherein the simultaneous engagement signal switch valve includes an input port configured to receive an input of the original pressure, an output port configured to communicate with the input port when being switched to the output position and produce an output of the original pressure as the simultaneous engagement signal pressure, and a lock oil chamber configured to receive an input of the simultaneous engagement signal pressure output from the output port to lock the spool to the output position.

4. The hydraulic control apparatus of an automatic transmission according to claim 3, further comprising:

a fail solenoid valve being capable of producing an output of the fail signal pressure; and a fail-safe switch valve configured to block the original pressure of the simultaneous engagement signal pressure of the simultaneous engagement signal switch valve and produce outputs of the original pressure from the original pressure switch valve to exhaust ports of two of the plurality of engagement pressure solenoid valves as reverse input pressures for reversely inputting the same upon receipt of an input of the fail signal pressure from the fail solenoid valve.

5. The hydraulic control apparatus of an automatic transmission according to claim 4, further comprising:
an original pressure switch solenoid valve being capable of producing an output of an original signal pressure for switching the original pressure switch valve; and
a shuttle valve configured to produce an output of a larger one of the original signal pressure and the simultaneous engagement signal pressure to the original pressure switch valve.

6. The hydraulic control apparatus of an automatic transmission according to claim 2, further comprising:
a fail solenoid valve being capable of producing an output of the fail signal pressure; and
a fail-safe switch valve configured to block the original pressure of the simultaneous engagement signal pressure of the simultaneous engagement signal switch valve and produce outputs of the original pressure from the original pressure switch valve to exhaust ports of two of the plurality of engagement pressure solenoid valves as reverse input pressures for reversely inputting the same upon receipt of an input of the fail signal pressure from the fail solenoid valve.

7. The hydraulic control apparatus of an automatic transmission according to claim 6, further comprising:
an original pressure switch solenoid valve being capable of producing an output of an original signal pressure for switching the original pressure switch valve; and
a shuttle valve configured to produce an output of a larger one of the original signal pressure and the simultaneous engagement signal pressure to the original pressure switch valve.

8. The hydraulic control apparatus of an automatic transmission according to claim 1, further comprising:
a fail solenoid valve being capable of producing an output of the fail signal pressure; and
a fail-safe switch valve configured to block the original pressure of the simultaneous engagement signal pressure of the simultaneous engagement signal switch valve and produce outputs of the original pressure from the original pressure switch valve to exhaust ports of two of the plurality of engagement pressure solenoid valves as reverse input pressures for reversely inputting the same upon receipt of an input of the fail signal pressure from the fail solenoid valve.

9. The hydraulic control apparatus of an automatic transmission according to claim 8, further comprising:
an original pressure switch solenoid valve being capable of producing an output of an original signal pressure for switching the original pressure switch valve; and
a shuttle valve configured to produce an output of a larger one of the original signal pressure and the simultaneous engagement signal pressure to the original pressure switch valve.

* * * * *